US010440655B2

(12) United States Patent
Webb et al.

(10) Patent No.: US 10,440,655 B2
(45) Date of Patent: Oct. 8, 2019

(54) ENODEB RESTRICTED BANWIDTH AND POWER BOOST OPERATION TO SUPPORT MTC DEVICES

(71) Applicant: SONY CORPORATION, Tokyo (JP)

(72) Inventors: Matthew William Webb, Basingstoke (GB); Hideji Wakabayashi, Basingstoke (GB); Brian Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/372,309

(22) Filed: Apr. 1, 2019

(65) Prior Publication Data
US 2019/0230598 A1 Jul. 25, 2019

Related U.S. Application Data

(60) Continuation of application No. 15/658,486, filed on Jul. 25, 2017, now Pat. No. 10,271,285, which is a
(Continued)

(30) Foreign Application Priority Data

Apr. 15, 2013 (GB) .................................. 1306767.3
Oct. 25, 2013 (EP) .................................... 13190389

(51) Int. Cl.
*H04W 48/08* (2009.01)
*H04W 52/14* (2009.01)
(Continued)

(52) U.S. Cl.
CPC ......... *H04W 52/143* (2013.01); *H04L 5/0053* (2013.01); *H04W 4/70* (2018.02);
(Continued)

(58) Field of Classification Search
CPC ....... H04W 4/90; H04W 4/029; H04W 4/025; H04W 76/18; H04W 76/50; H04W 76/16; H04W 60/005
See application file for complete search history.

(56) References Cited

U.S. PATENT DOCUMENTS

2007/0001025 A1   1/2007 Gunnarsson
2007/0049267 A1*  3/2007 Kota ..................... G01S 5/0036
                                                       455/423
(Continued)

FOREIGN PATENT DOCUMENTS

EP   2 493 780 A   9/2012
GB   2 487 757 A   8/2012
(Continued)

OTHER PUBLICATIONS

"Low-cost Capability Issues" Sony, 3GPP TSG-RAN WG 2 Meeting #85, Feb. 10-14, 2014, http://www.3gpp.org/ftp/Meetings_3GPP_SYNC/RAN/RAN2/Docs/, 4 pages.
(Continued)

*Primary Examiner* — Chuong A Ngo
(74) *Attorney, Agent, or Firm* — Xsensus LLP

(57) ABSTRACT

A wireless telecommunication system includes base stations for communicating with terminal devices. One or more base stations support a power boost operating mode in which a base station's available transmission power is concentrated in a subset of its available transmission resources to provide enhanced transmission powers as compared to transmission powers on these transmission resources when the base station is not operating in the power boost mode. A base station establishes an extent to which one or more base stations in the wireless telecommunications system supporting the power boost operating mode conveys an indication of this to a terminal device. The terminal device receives the indication and uses the corresponding information to control
(Continued)

its acquisition of a base station of the wireless telecommunication system, for example by taking account of which base stations support power boosting and/or when power boosting is supported during a cell attach procedure.

15 Claims, 9 Drawing Sheets

Related U.S. Application Data division of application No. 14/779,763, filed as application No. PCT/EP2014/057394 on Apr. 11, 2014, now Pat. No. 9,743,359.

(51) Int. Cl.
  *H04W 52/34* (2009.01)
  *H04W 4/70* (2018.01)
  *H04L 5/00* (2006.01)
  *H04W 52/36* (2009.01)

(52) U.S. Cl.
  CPC ......... *H04W 48/08* (2013.01); *H04W 52/346* (2013.01); *H04W 52/367* (2013.01)

(56) References Cited

U.S. PATENT DOCUMENTS

| | | | |
|---|---|---|---|
| 2007/0076807 A1 | 4/2007 | Jin | |
| 2010/0118992 A1 | 5/2010 | Terabe | |
| 2012/0032789 A1 | 2/2012 | Ichimaru et al. | |
| 2013/0083753 A1 | 4/2013 | Lee et al. | |
| 2013/0012130 A1 | 5/2013 | Guo et al. | |
| 2014/0011228 A1 | 1/2014 | Montelione et al. | |
| 2014/0036820 A1 | 2/2014 | McNamara et al. | |
| 2014/0014673 A1 | 5/2014 | Morioka et al. | |
| 2014/0341358 A1* | 11/2014 | Goswami | H04W 4/029 379/45 |
| 2017/0366955 A1* | 12/2017 | Edge | H04W 4/90 |

FOREIGN PATENT DOCUMENTS

| | | |
|---|---|---|
| GB | 2 487 780 A | 8/2012 |
| GB | 2 487 782 A | 8/2012 |
| GB | 2 487 906 A | 8/2012 |
| GB | 2 487 908 A | 8/2012 |
| GB | 2 487 909 A | 8/2012 |
| GB | 2 488 513 A | 9/2012 |
| GB | 2 491 858 A | 12/2012 |
| GB | 2 592 873 A1 | 5/2013 |
| GB | 2 497 743 A1 | 6/2013 |
| GB | 2 512 126 A | 9/2014 |
| GB | 2 512 127 A | 9/2014 |
| WO | 2012/104629 A2 | 8/2012 |
| WO | 2013/000818 A1 | 1/2013 |

OTHER PUBLICATIONS

"LTE; Evolved Universal Terrestrial Radio Access (E-UTRA); User Equipment (UE) procedures in idle mode 3GPP TS 36.304, version 11.2.0, release 11" ETSI TS 136 304 (Feb. 2013), 35 pages.

International Search Report dated Oct. 20, 2014 for PCT/EP2014/057394 filed Apr. 11, 2014.

"Digital cellular telecommunications system (Phase 2+); Universal Mobile Telecommunications System (UMTS); Non-Access-Stratum (NAS) functions related to Mobile Station (MS) in idle mode 3GPP TS 23.122 version 11.4.0, release 11" ETSI TS 123 122, (Jan. 2013), 48 pages.

"LTE; Evolved Universal Terrestrial Radio Access (E-UTRA): User Equipment (UE) radio transmission and reception 3GPP TS 36.101 version 11.3.0 release 11", ETSI TS 136 101, (Feb. 2013), 391 pages.

Search Report and Office Action issued in Chinese Application 201480021615.0 dated Jul. 19, 2018.

European Search Report dated Jul. 19, 2018 in European Patent Application No. 14717133.4-1214.

Japanese Office Action dated Oct. 31, 2017 in Patent Application No. 2016-506990 (with Partial English Translation).

* cited by examiner

ENODEB RESTRICTED BANWIDTH AND POWER BOOST OPERATION TO SUPPORT MTC DEVICES

The present application is a continuation application which claims the benefit of priority under 35 U.S.C. § 120 of U.S. application Ser. No. 15/658,486, filed Jul. 25, 2017, which is a divisional of U.S. application Ser. No. 14/779,763, filed Sep. 24, 2015, which is a National Stage Entry of International Application PCT/EP2014/057394 filed Apr. 11, 2014, and claims priority to British Patent Application 1306767.3 filed in the UK IPO on Apr. 15, 2013 and European Patent Application 13190389.0, filed in the European Patent Office on Oct. 25, 2013, the entire contents of each of which being incorporated herein by reference.

BACKGROUND OF THE INVENTION

The present invention relates to methods and apparatus for use in wireless (mobile) telecommunications systems. In particular, embodiments of the invention relate to methods and apparatus for providing coverage extension in wireless telecommunications systems.

Third and fourth generation mobile telecommunication systems, such as those based on the 3GPP defined UMTS and Long Term Evolution (LTE) architecture are becoming able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and there is a corresponding desire to extend the coverage available in such telecommunications systems (i.e. there is a desire to provide more reliable access to wireless telecommunications systems for terminal devices operating in coverage-limited locations).

A typical example of a coverage-limited terminal device might be a so-called machine type communication (MTC) device, such as a smart meter located in a customer's house and periodically transmitting information back to a central MTC server relating to the customer's consumption of a utility, such as gas, water, electricity and so on. Such a terminal device might operate in a coverage-limited location because, for example, it may be located in a basement or other location with relatively high penetration loss.

In some situations a terminal device in a coverage-limited situation in a particular communication cell served by a base station might be unable to receive communications from the base station unless specific provision is made for it to do so. One simple way to increase coverage in this situation would be for the base station to increase the power of its transmissions. However, a blanket increase in transmission power from a base station would be expected to give rise to correspondingly increased interference in neighbouring communication cells. An alternative approach would be for the base station to in effect focus/concentrate its available transmission power budget into a subset of transmission resources (e.g. in terms of frequency) which are selected from within the base station's overall transmission resources and allocated for transmissions to coverage-limited terminal devices. In this manner increased power may be made available for communicating with terminal devices in "hard to reach" locations without exceeding a base station's overall power budget. Such an approach may be referred to as power boosting. Thus, a base station with power boosting capability may focus its available transmission power within a restricted subset of transmission resources allocated to coverage-limited terminal devices.

This power boosting approach is schematically represented in FIGS. 1A and 1B which show example plots of maximum allowed transmission power P versus frequency f for two modes of operation for a base station in an LTE-based wireless telecommunication network. FIG. 1A represents a normal mode of operation in which the maximum allowed transmission power is uniform across the base station's full operating bandwidth $S_{BW}$ (e.g. 20 MHz) at a level of $P_0$. FIG. 1B, on the other hand, represents a power boosted mode of operation for the base station in which the overall available transmission power is in effect concentrated with transmissions being allowed at a power level $P_{PB}$, which is greater than the power $P_0$ for the normal operating mode, across a bandwidth $PB_{BW}$, which is less than the bandwidth $S_{BW}$ for the normal operating mode. It can be expected a base station will be adapted to switch between normal and power boosted operating modes, for example depending on current or expected traffic conditions. The overall transmission power will typically be broadly the same in both operating modes (i.e. the areas under the curves in FIGS. 1A and 1B will be the same). For the sake of a concrete example, in one power boosted operating mode implementation $PB_{BW}$ may be approximately one quarter of $S_{BW}$ (e.g. $S_{BW}$=20 MHz and $PB_{BW}$=5 MHz) while $P_{PB}$ may be approximately four times $P_0$. Thus, in this example implementation the base station may transmit up to four times more power on transmission resources allocated to a coverage-limited terminal device within the frequency bandwidth $P_{BW}$ without exceeding an overall power budget for the base station. In practice, communications with specific terminal devices on specific subcarriers may be made with less power than the maximum allowed, taking into account the conventional power control mechanisms provided in wireless telecommunications systems.

Thus, a wireless telecommunications network adapted to provide coverage in challenging situations by power boosting may at times re-configure itself to concentrate its available transmit power into a number of resource elements (REs) occupying in total less than the nominal system bandwidth. A coverage-limited terminal device may be allocated resources on these power-boosted resource elements making it more likely to be able to use the cell.

As is well understood, in an LTE type network there are two Radio Resource Control (RRC) modes for terminal devices, namely: (i) RRC idle mode (RRC_IDLE); and (ii) RRC connected mode (RRC_CONNECTED). When a terminal device transmits data, RRC connected mode is required. In RRC idle mode, the core network (CN) part of the wireless telecommunications system recognizes the terminal device is present within the network, but the radio access network (RAN) part of the wireless telecommunications system does not. As is conventional for an LTE-type wireless telecommunications network, a terminal device may conduct Reference Signal Received Power (RSRP)/Reference Signal Received Quality (RSRQ) measurements in communication cells in which it can operate and may autonomously decide to camp on one particular cell (e.g. according to RSRP/RSRQ threshold tests and the Public Land Mobile Network (PLMN) identities of the cells) in order to receive system information (SI) and paging messages. In accordance with this approach the base stations supporting communications in the respective cells do not themselves play a role in cell selection for terminal devices in idle mode with the process of cell selection/reselection in idle mode being performed autonomously by the terminal devices. This is in contrast to the cell-change procedures in RRC connected mode in which case terminal devices are under control of the RAN and the handover process is a network controlled behaviour (with assistance from terminal device measurements).

A terminal device that could benefit from power boosting as described above to more reliably operate in a communication cell will typically not know at the point of trying to acquire or camp on a cell whether the base station of the cell supports power-boosting. As a consequence, a terminal device may spend time and power resources undertaking a camp on procedure for a cell, for example by decoding Primary Synchronisation Signalling (PSS), Secondary Synchronisation Signalling (SSS), a Physical Broadcast Channel (PBCH) and SI of a cell, and then subsequently undertake a random access procedure using Physical Random Access Channel (PRACH) resources to access the cell, only to find the cell does not support power boosting and so cannot reliably support communications with the terminal device on channels such as a Physical Downlink Control Channel (PDCCH) and Physical Downlink Shared Channel (PDSCH).

Even for a base station which is able to support power boosting, it may be that the above-discussed power boosting approach to extending coverage may not be supported by the base station at all times so as to reduce the impact on other terminal devices operating in the cell. For example, power boosting may only be supported at certain times of day or night within a given communication cell according to when it is expected the resources required to properly support conventional terminal devices operating in the cell may be reduced. In these cases it may be appropriate for terminal devices requiring power boosting to wait ("sleep") until such time that power boosting is supported before seeking to acquire the relevant cell.

There is therefore a need for schemes which assist in the process by which a terminal device which may benefit from power boosting for reliable communications in a wireless telecommunications system seeks to camp on/access base stations of the wireless telecommunications system.

SUMMARY OF THE INVENTION

According to a first aspect of the invention there is provided a method of operating a terminal device in a wireless telecommunication system comprising one or more base stations which support a power boost operating mode in which a base station's available transmission power is concentrated to provide enhanced transmission powers in a subset of its available transmission resources, the method comprising: receiving an indication of the extent to which one or more base stations support the power boost operating mode in the wireless telecommunication system; and controlling acquisition of a base station of the wireless telecommunication system in a manner that takes account of the indicated extent to which one or more base stations support the power boost mode.

In accordance with certain embodiments the indication of the extent to which one or more base stations support the power boost operating mode comprises one or more indications selected from the group comprising: (i) an indication of whether or not one or more base stations are configured to have the ability to operate in the power boost operating mode; (ii) an indication of times during which one or more base stations are configured to use the boost operating mode; (iii) an indication of available enhanced transmission powers for one or more base stations when operating in the power boost operating mode; (iv) an indication of which downlink physical channels of the wireless telecommunications system can be transmitted by one or more base stations using the power boost operating mode.

In accordance with certain embodiments the step of controlling acquisition of a base station comprises choosing a base station to acquire from among a plurality of available base stations in a manner that takes account of the indicated extent to which one or more base stations support the power boost mode in the wireless telecommunication system.

In accordance with certain embodiments the step of choosing a base station to acquire is performed during a cell section or a cell reselection procedure of the terminal device.

In accordance with certain embodiments the step of controlling acquisition of a base station comprises delaying acquisition of the base station for a period of time based on the indication of the extent to which one or more base stations support the power boost operating mode in the wireless telecommunication system.

In accordance with certain embodiments the method further comprises the terminal device entering a reduced activity mode during a period of time for which acquisition of the base station is delayed.

In accordance with certain embodiments the method further comprises deriving one or more characteristics of received signals from one or more base stations in the wireless telecommunications system, and wherein the step of controlling acquisition of a base station also takes account of the one or more derived characteristics.

In accordance with certain embodiments the derived one or more characteristics are derived from reference signal received power (RSRP) measurements and/or reference signal received quality (RSRQ) measurements associated with reference signals transmitted by one or more base stations in the wireless telecommunications system.

In accordance with certain embodiments the indication of the extent to which one or more base stations support the power boost operating mode in the wireless telecommunication system includes an indication which is specific to an individual base station.

In accordance with certain embodiments the indication of the extent to which one or more base stations support the power boost operating mode in the wireless telecommunication system comprises an indication which is applicable for a plurality of base stations.

In accordance with certain embodiments the step of receiving the indication of the extent to which one or more base stations support the power boost operating mode comprises receiving from a first base station an indication of the extent to which the first base station supports the power boost operating mode.

In accordance with certain embodiments the step of receiving the indication of the extent to which one or more base stations support the power boost operating mode further comprises receiving from a further base station an indication of the extent to which the further base station supports the power boost operating mode.

In accordance with certain embodiments the step of receiving the indication of the extent to which one or more base stations support the power boost operating mode comprises receiving from a first base station an indication of the extent to which a second, different, base station supports the power boost operating mode.

In accordance with certain embodiments the first base station is a base station to which the terminal device is connected and the second base station is a base station to which the terminal device is not connected.

In accordance with certain embodiments the step of controlling acquisition of a base station of the wireless telecommunication system comprises determining whether or not to disconnect from the first base station and to connect to the second base station.

In accordance with certain embodiments the indication of the extent to which one or more base stations support the power boost operating mode is received by the terminal device in communications received from one or more base station to which terminal device is not connected.

In accordance with certain embodiments the indication of the extent to which one or more base stations support the power boost operating mode is implicitly conveyed to the terminal device in association with transmissions made by base stations in the wireless telecommunications system for communicating other information.

In accordance with certain embodiments the step of receiving the indication of the extent to which one or more base stations support the power boost operating mode in the wireless telecommunication system comprises receiving broadcast signalling from one or more base stations and deriving the indication of the extent to which one or more base stations support the power boost operating mode from the transmission resources used for the broadcast signalling.

In accordance with certain embodiments the broadcast signalling comprises synchronisation signalling In accordance with certain embodiments the indication of the extent to which one or more base stations support the power boost operating mode is received by the terminal device using explicit signalling.

In accordance with certain embodiments the explicit signalling comprises system information signalling received from a base station.

In accordance another aspect of the disclosure there is provided a method of operating a terminal device in a wireless telecommunication system comprising one or more base stations which support a virtual carrier operating mode in which at least some downlink communications are made using a restricted subset of transmission resources selected from within a system frequency bandwidth and comprising a restricted bandwidth downlink channel having a channel bandwidth which is smaller than the system frequency bandwidth, the method comprising: receiving an indication of the extent to which one or more base stations support the virtual carrier operating mode in the wireless telecommunication system; and controlling acquisition of a base station of the wireless telecommunication system in a manner that takes account of the indicated extent to which one or more base stations support the virtual carrier operating mode.

In accordance with certain embodiments, the step of receiving the indication of the extent to which one or more base stations support the virtual carrier operating mode comprises receiving from a first base station an indication of the extent to which a second, different, base station supports the virtual carrier operating mode.

In accordance with certain embodiments, the first base station is a base station to which the terminal device is connected and the second base station is a base station to which the terminal device is not connected.

In accordance with certain embodiments, the indication of the extent to which one or more base stations support the virtual carrier operating mode is received by the terminal device using explicit signalling.

In accordance with certain embodiments, the explicit signalling comprises system information signalling received from a base station.

In accordance with another aspect of the invention there is provided a terminal device for use in a wireless telecommunication system comprising one or more base stations which support a power boost operating mode in which a base station's available transmission power is concentrated to provide enhanced transmission powers in a subset of its available transmission resources, wherein the terminal device is configured to: receive an indication of the extent to which one or more base stations support the power boost operating mode in the wireless telecommunication system and control acquisition of a base station of the wireless telecommunication system in a manner that takes account of the indicated extent to which one or more base stations support the power boost mode.

In accordance another aspect of the disclosure there is provided a terminal device for use in a wireless telecommunication system comprising one or more base stations which support a virtual carrier operating mode in which at least some downlink communications are made using a restricted subset of transmission resources selected from within a system frequency bandwidth and comprising a restricted bandwidth downlink channel having a channel bandwidth which is smaller than the system frequency bandwidth, wherein the terminal device is configured to receive an indication of the extent to which one or more base stations support the virtual carrier operating mode in the wireless telecommunication system, and to control acquisition of a base station of the wireless telecommunication system in a manner that takes account of the indicated extent to which one or more base stations support the virtual carrier operating mode.

In accordance with another aspect of the invention there is provided a method of operating a base station in a wireless telecommunication system comprising one or more base stations which support a power boost operating mode in which a base station's available transmission power is concentrated to provide enhanced transmission powers in a subset of its available transmission resources, the method comprising: establishing an extent to which one or more base stations support the power boost operating mode; and, conveying an indication of the extent to which one or more base stations support the power boost operating mode to a terminal device operating in the wireless telecommunication system so the terminal device can take account of the indication of the extent to which one or more base stations support the power boost operating mode for controlling its acquisition of a base station of the wireless telecommunication system.

In accordance with certain embodiments the indication of the extent to which one or more base stations support the power boost operating mode comprises one or more indications selected from the group comprising: (i) an indication of whether or not one or more base stations are configured to have the ability to operate in the power boost operating mode; (ii) an indication of times during which one or more base stations are configured to use the boost operating mode; (iii) an indication of available enhanced transmission powers for one or more base stations when operating in the power boost operating mode; (iv) an indication of which downlink physical channels of the wireless telecommunications system can be transmitted by one or more base stations using the power boost operating mode.

In accordance with certain embodiments the method further comprises transmitting reference signals to allow the terminal device to derive one or more characteristics of received reference signals for use in conjunction with the indication of the extent to which one or more base stations support the power boost operating mode when controlling acquisition of a base station of the wireless telecommunication system.

In accordance with certain embodiments the indication of the extent to which one or more base stations support the power boost operating mode in the wireless telecommunication system includes an indication which is specific to the base station.

In accordance with certain embodiments the indication of the extent to which one or more base stations support the power boost operating mode in the wireless telecommunication system is applicable for a plurality of base stations.

In accordance with certain embodiments the indication relates to the extent the base station supports the power boost operating mode in the wireless telecommunication system and does not relate to the extent any other base station supports the power boost operating mode in the wireless telecommunication system.

In accordance with certain embodiments the indication relates to the extent at least one other base station supports the power boost operating mode in the wireless telecommunication system.

In accordance with certain embodiments the terminal device is connected to the base station and is not connected to the at least one other base station.

In accordance with certain embodiments the method further comprises receiving from at least one further base station an indication of the extent to which the at least one further base station supports the power boost operating mode in the wireless telecommunication system.

In accordance with certain embodiments the terminal device is not connected to the base station at the time the indication of the extent to which one or more base stations support the power boost operating mode is conveyed to the terminal device.

In accordance with certain embodiments the indication of the extent to which one or more base stations support the power boost operating mode is implicitly conveyed to the terminal device in association with transmissions made by the base station for communicating other information.

In accordance with certain embodiments the step of conveying the indication of the extent to which one or more base stations support the power boost operating mode in the wireless telecommunication system comprises transmitting broadcast signalling using transmission resources selected according to the indication to be conveyed.

In accordance with certain embodiments the broadcast signalling comprises synchronisation signalling In accordance with certain embodiments the indication of the extent to which one or more base stations support the power boost operating mode is conveyed to the terminal device using explicit signalling.

In accordance with certain embodiments the explicit signalling comprises system information signalling.

In accordance with another aspect of the disclosure there is provided a method of operating a base station in a wireless telecommunication system comprising one or more base stations which support a virtual carrier operating mode in which at least some downlink communications are made using a restricted subset of transmission resources selected from within a system frequency bandwidth and comprising a restricted bandwidth downlink channel having a channel bandwidth which is smaller than the system frequency bandwidth, the method comprising establishing an extent to which one or more base stations support the virtual carrier operating mode; and conveying an indication of the extent to which one or more base stations support the virtual carrier operating mode to a terminal device operating in the wireless telecommunication system so the terminal device can take account of the indication of the extent to which one or more base stations support the virtual carrier operating mode for controlling its acquisition of a base station of the wireless telecommunication system.

In accordance with certain embodiments the indication relates to the extent at least one other base station supports the virtual carrier operating mode in the wireless telecommunication system.

In accordance with certain embodiments the terminal device is connected to the base station and is not connected to the at least one other base station.

In accordance with certain embodiments the method further comprises receiving from at least one further base station an indication of the extent to which the at least one further base station supports the virtual carrier operating mode in the wireless telecommunication system.

In accordance with certain embodiments the indication of the extent to which one or more base stations support the virtual carrier operating mode is conveyed to the terminal device using explicit signalling.

In accordance with certain embodiments the explicit signalling comprises system information signalling.

In accordance with another aspect of the invention there is provided a base station for use in a wireless telecommunication system comprising one or more base stations which support a power boost operating mode in which a base station's available transmission power is concentrated to provide enhanced transmission powers in a subset of its available transmission resources, wherein the base station is configured to: establish an extent to which one or more base stations support the power boost operating mode; and, convey an indication of the extent to which one or more base stations support the power boost operating mode to a terminal device operating in the wireless telecommunication system so the terminal device can take account of the indication of the extent to which one or more base stations support the power boost operating mode for controlling its acquisition of a base station of the wireless telecommunication system.

In accordance with another aspect of the disclosure there is provided a base station for use in a wireless telecommunication system comprising one or more base stations which support a virtual carrier operating mode in which at least some downlink communications are made using a restricted subset of transmission resources selected from within a system frequency bandwidth and comprising a restricted bandwidth downlink channel having a channel bandwidth which is smaller than the system frequency bandwidth, wherein the base station is configured to establish an extent to which one or more base stations support the virtual carrier operating mode and to convey an indication of the extent to which one or more base stations support the virtual carrier operating mode to the terminal device operating in the wireless telecommunication system so the terminal device can take account of the indication of the extent to which one or more base stations support the virtual carrier operating mode for controlling its acquisition of a base station of the wireless telecommunication system.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 2:
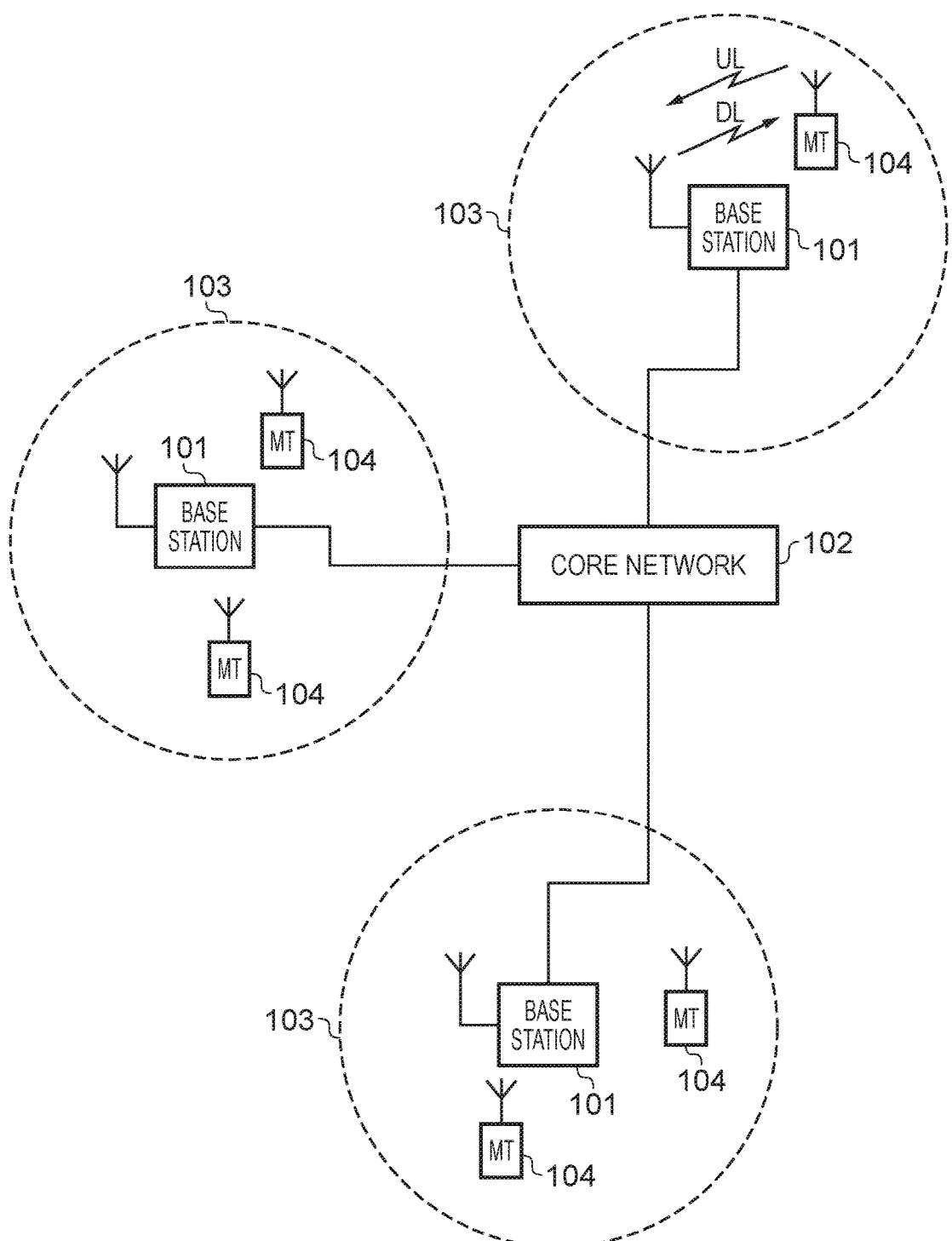

FIG. 2 provides a schematic diagram illustrating some basic functionality of a wireless telecommunications network/system operating in accordance with LTE principles. Various elements of FIG. 2 and their respective modes of operation are well-known and defined in the relevant standards administered by the 3GPP® body and also described in many books on the subject, for example, Holma, H. and Toskala, A. [1].

The network includes a plurality of base stations 101 connected to a core network 102. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

Figure 3:
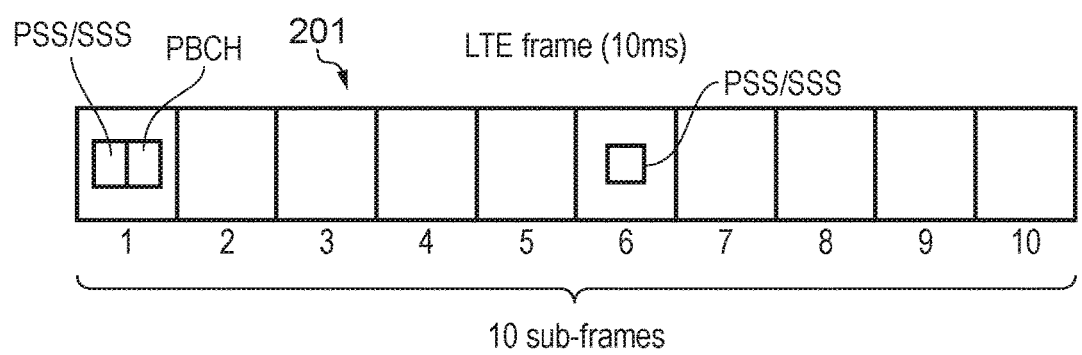
FIG. 3 provides a schematic diagram illustrating a conventional LTE radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 3 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 4:
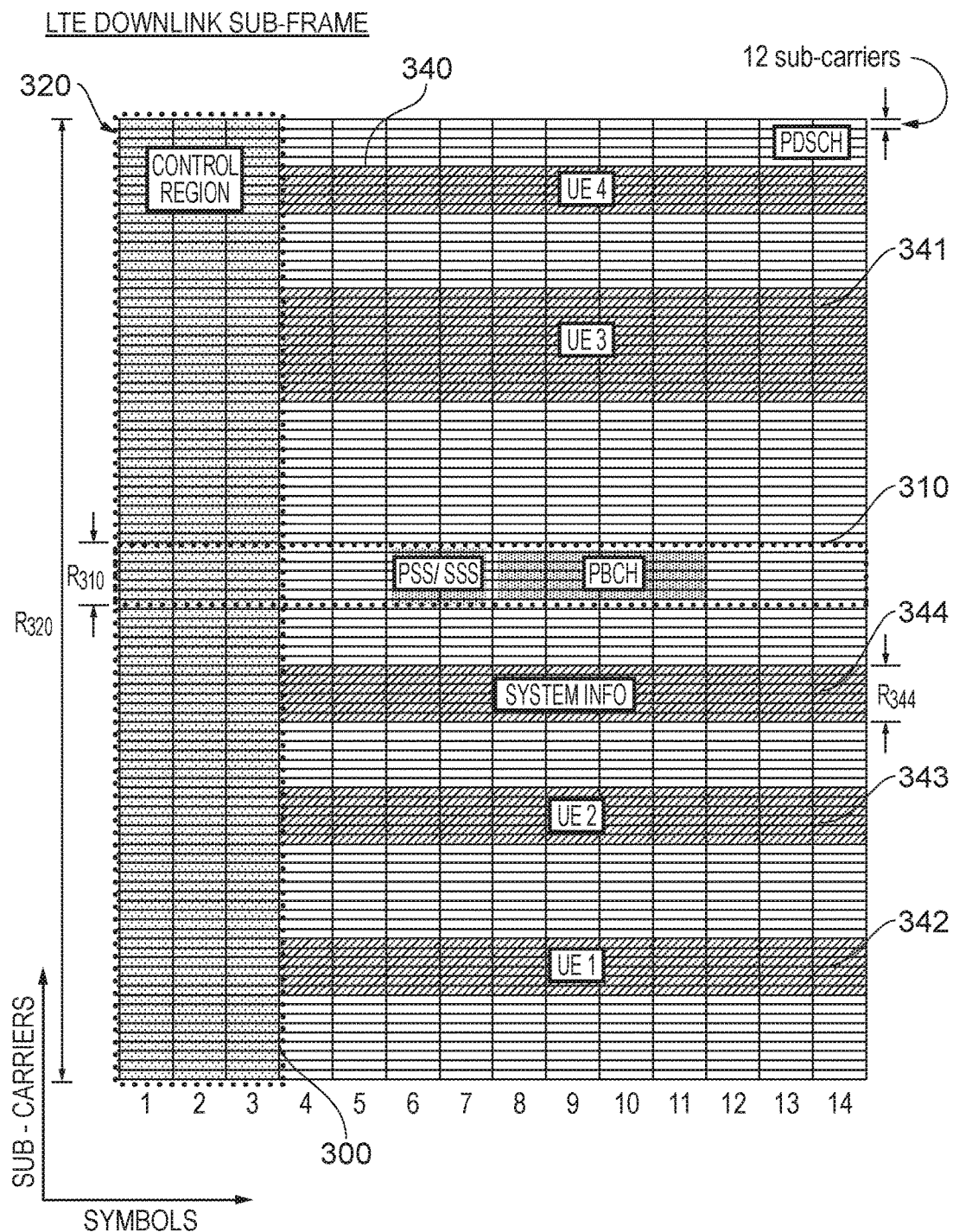
FIG. 4 provides a schematic diagram illustrating an example of a conventional LTE downlink radio subframe.

FIG. 4 is a schematic diagram of a grid which illustrates the structure of an example conventional downlink LTE subframe. The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 4 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 4, each individual resource element (a resource element comprises a single symbol on a single subcarrier) is not shown, instead each individual box in the subframe grid corresponds to twelve sub-carriers transmitted on one symbol.

FIG. 4 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 4) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 4 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 4 also shows a region of PDSCH containing system information and extending over a bandwidth of $R_{344}$. A conventional LTE frame will also include reference signals which are not shown in FIG. 4 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 4). As is known in the art, data transmitted on the PDCCH, PCFICH and PHICH is typically distributed on the sub-carriers across the entire bandwidth of the subframe to provide for frequency diversity. Therefore a conventional LTE terminal must be able to receive the entire channel bandwidth in order to receive and decode the control region.

Figure 5:
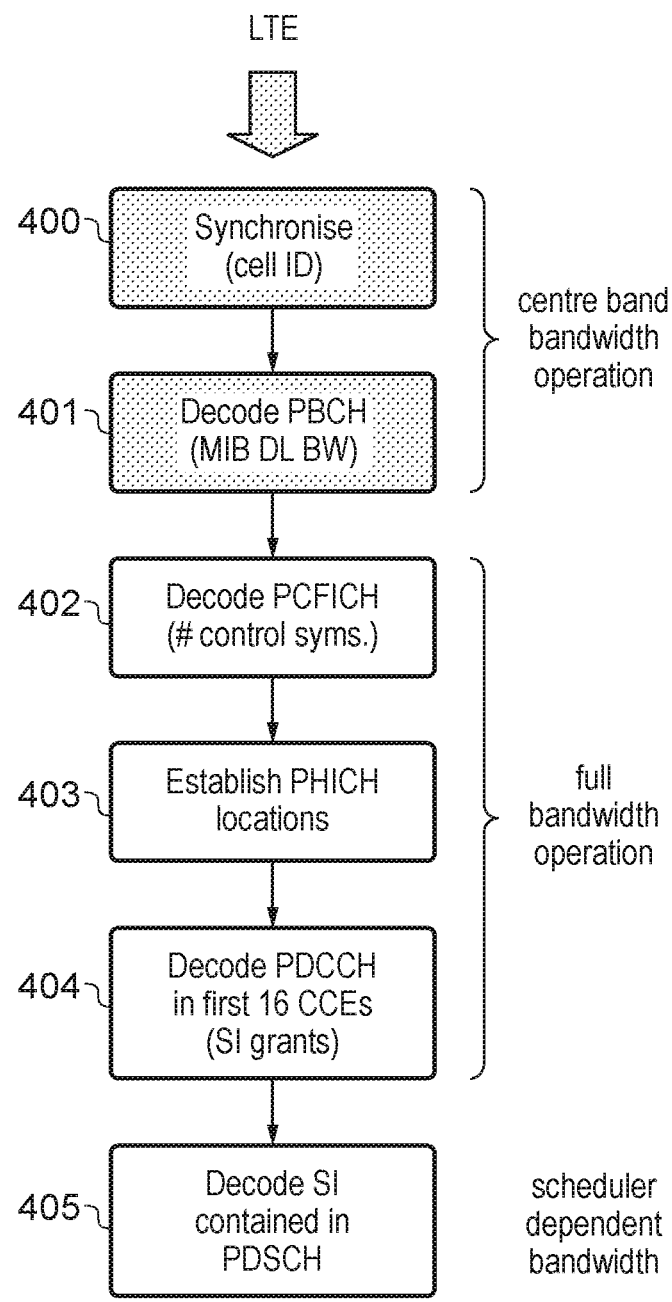
FIG. 5 provides a schematic diagram illustrating a conventional LTE "camp-on" procedure.

FIG. 5 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 5, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each subframe, the terminal then decodes the PCFICH which is distributed across the entire bandwidth of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At the PCFICH decoding stage, with a 20 MHz carrier band, the terminal operates at a much larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its resource allocations. The resource allocations are used by the terminal to locate system information and to locate its data in the PDSCH as well as to be informed of any transmission resources it has been granted on PUSCH. Both system information and UE-specific resource allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a subframe. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each subframe as discussed above. In a subframe, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE subframe the PDSCH generally occupies groups of resource elements which are neither in the control region nor in the resource elements occupied by PSS, SSS or PBCH. The data in the blocks of resource elements 340, 341, 342, 343 allocated to the different mobile communication terminals (UEs) shown in FIG. 4 have a smaller bandwidth than the bandwidth of the entire carrier, although to decode these blocks a terminal first receives the PDCCH spread across the frequency range $R_{320}$ to determine if the PDCCH indicates that a PDSCH resource is allocated to the UE and should be decoded. Once a UE has received the entire subframe, it can then decode the PDSCH in the relevant frequency range (if any) indicated by the PDCCH. So for example, UE 1 discussed above decodes the whole control region 300 and then the data in the resource block 342.

Figures 1A, 1B:
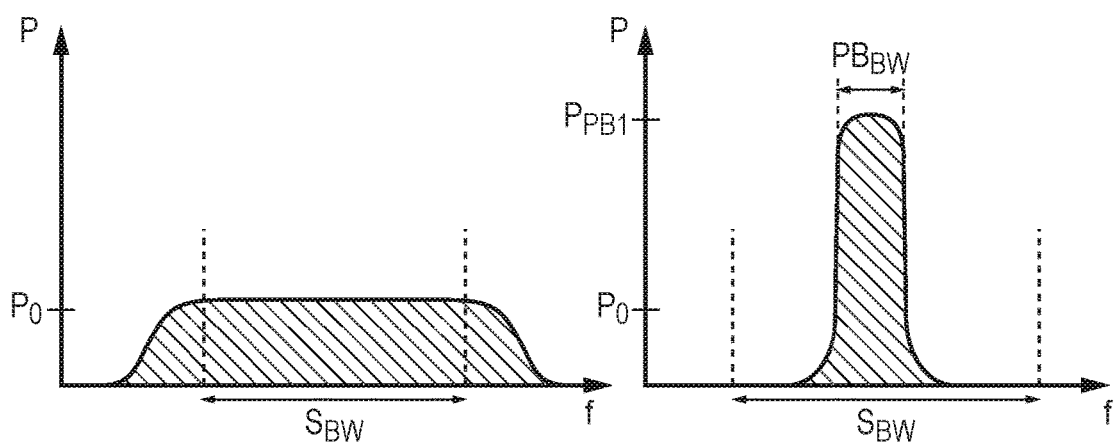
FIGS. 1A and 1B schematically show example plots of transmission power versus frequency for two modes of operation for a base station in an LTE-based wireless telecommunication network operating at it maximum permissible power output FIG. 2 provides a schematic diagram illustrating an example of a conventional mobile telecommunication network.

As noted above, it is expected that certain terminal devices might be in locations with relatively high penetration loss as regards radio communications with a base station. For example, an MTC-type terminal device associated with a smart meter application may be located in a basement. This can mean certain devices may require a base station to transmit with significantly higher power levels than for other terminal devices coupled to the base station in order to support reliable communications. Although it may be expected that MTC type terminal devices might often be in "harder to reach" locations than other types of terminal device, it will be appreciated the issues relating to coverage extension as discussed herein can equally apply to non-MTC type terminal devices. As schematically represented in FIG. 1B and discussed above, one proposal for reliably supporting communications with terminal devices in areas of relatively poor coverage without simply increasing the overall transmission power from a base station is to focus a base station's transmission budget into relatively high powered transmissions in a subset of frequencies spanning a bandwidth which is less than the normal operating bandwidth for the base station. However, as also noted above, a terminal device seeking to camp on/access a particular base station in accordance with conventional techniques will generally be unaware of the circumstances in which the base station can support power boosting until the terminal device has been able to decode relatively high-level system information associated with the base station. That is to say, the terminal device must undergo the process of FIG. 5 before determining whether or not the base station can in fact reliably support communications with the terminal device in a power-boosted mode of operation. Certain embodiments of the invention are directed to schemes for providing terminal devices with information on base stations' capabilities to operate in a power boosting mode (e.g. in terms of if/when a base station supports power boosting) with a view to reducing wasted camp on attempts.

Figure 6:
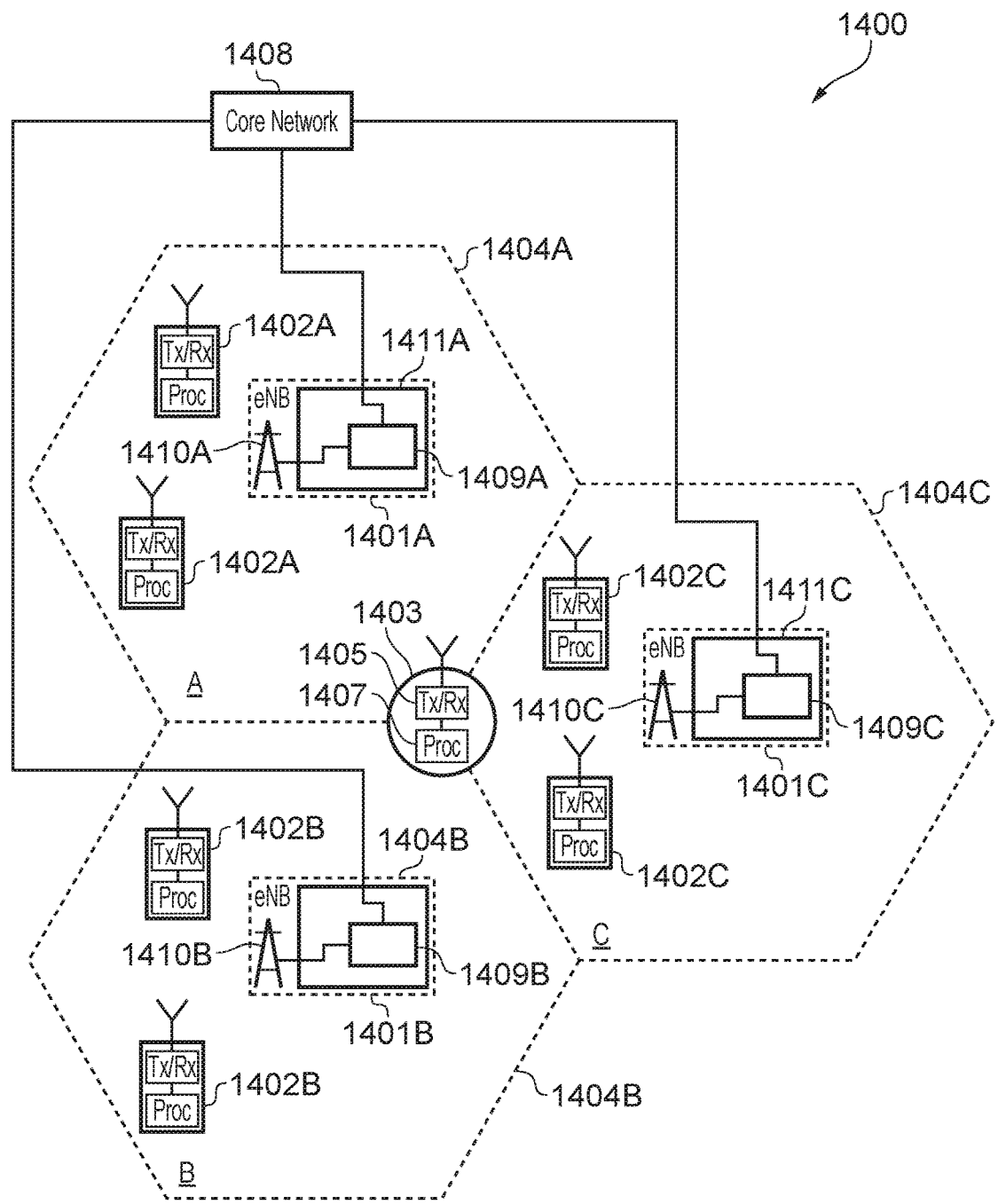
FIG. 6 schematically represents some elements of a wireless telecommunication system in accordance with some embodiments of the invention.

FIG. 6 is a schematic diagram showing part of a telecommunications system 1400 arranged in accordance with an example of the present invention. The telecommunications system 1400 in this example is based broadly on an LTE-type architecture. As such many aspects of the operation of the telecommunications system 1400 are known and understood and are not described here in detail in the interest of brevity. Operational aspects of the telecommunications system 1400 which are not specifically described herein may be implemented in accordance with any known techniques, for example according to the current LTE standards.

Represented in FIG. 6 are three communication cells 1404A, B. C supported by respective base stations 1401A, B, C coupled to a core network 1408. The communication cells are nominally represented in FIG. 6 as adjacent hexagons, but it will be appreciated in practice the respective coverage areas associated with the different base stations will overlap such that an individual terminal device may be located within the nominal geographic footprint of more than one base station. For example, it is assumed here a terminal device 1403 in accordance with an embodiment of the invention happens to be at a location which is within the nominal coverage areas of all three base stations 1401A, B, C. This is schematically shown in FIG. 6 by the terminal device 1403 being represented at a point where the three hexagons schematically representing the three communication cells 1404A, B, C meet. Accordingly, the terminal device 1403 may in principle access (i.e. connect to or camp on) any of the base stations 1401A, B, C.

In accordance with common practice, the terms base station and cell may sometimes be used herein interchangeably, for example, the process of a terminal device connecting to the radio access part of a wireless telecommunications system might be referred to as accessing a cell or accessing a base station.

It will be appreciated that in general a system such as that represented in FIG. 6 will comprise a greater number of cells arranged to provide coverage over a more extended geographic area. As is conventional for LTE-type networks, the respective base stations 1401A, B, C may communicate with one another over the so-called X2 interface which interconnects base stations in a peer-to-peer fashion.

For the sake of a concrete example, it will be assumed here the two base stations 1401A, 1402B are configured to support a power boosting mode of operation while the base station 1401C is not configured to support a power boosting mode of operation.

Referring to FIG. 6, communication cell 1404A thus includes base station (enhanced Node B/eNB) 1401A connected to the core network 1408. The base station 1401A comprises a transceiver unit 1410A for transmission and reception of wireless signals and a controller unit 1411A configured to control the base station 1401A. The controller unit 1411A may comprise various sub-units, such as a scheduling unit 1409A and other functional units for providing functionality in accordance with embodiments of the invention as explained further below. These sub units may be implemented as discrete hardware elements or as appropriately configured functions of the controller unit. Thus, the controller unit 1411A may comprise a processor unit which is suitably configured/programmed to provide the desired functionality described herein using conventional programming/configuration techniques for equipment in wireless telecommunications systems. The transceiver unit 1410A and the controller unit 1411A are schematically shown in FIG. 6 as separate elements for ease of representation. However, it will be appreciated that the functionality of these units can be provided in various different ways following established practices in the art, for example using a single suitably programmed integrated circuit coupled to an antenna. It will be appreciated the base station 1401A will in general comprise various other elements associated with its operating functionality.

The base station 1401A may communicate with a plurality of conventional LTE terminals 1402A within the coverage area of the cell 1404A in accordance with conventional techniques. The base station 1401A is arranged to transmit downlink data using a subframe structure that follows that schematically represented in FIG. 4, and furthermore, this may be done in either a normal operating mode or a power boosted operating mode as discussed above and schematically represented in FIGS. 1A and 1B.

As noted above, it is assumed here for the sake of a concrete example the base stations 1401A. 1401B associated with communication cells 1404A, 1404B both support a power boosted mode of operation, whereas the base stations 1401C associated with communication cells 1404C does not. The various elements and functionality associated with the communication cell 1404B are thus in essence the same as for the communication cell 1404A. Similarly, the various elements and functionality associated with the communication cell 1404C are in essence the same as for the communication cell 1404A (except the base station 1401C of communication cell 1404C is assumed in this example to not support the power boosted mode of operation). With this in mind, it will be appreciated the various elements of communication cells 1404B, 1404C represented in FIG. 6 will be similar to, and will be understood from, the corresponding elements of communication cell 1404A (except for the inability of base station 1401C to support power boosted transmissions).

As noted above, a terminal device 1403 in accordance with an embodiment of the invention is also represented in FIG. 6 at a location within the nominal geographic footprint of each of the three communication cells 1404A, B, C associated with the three base stations 1401A, B, C. The terminal device 1403 may be based around any conventional terminal device with adaptions to support operation in accordance with embodiments of the invention as described herein.

The terminal device 1403 comprises a transceiver unit 1405 for transmission and reception of wireless signals and a controller unit 1407 configured to control the device 1403. The controller unit 1407 may comprise various sub-units for providing functionality in accordance with embodiments of the invention as explained herein. These sub units may be implemented as discrete hardware elements or as appropriately configured functions of the controller unit. Thus the controller unit 1407 may comprise a processor unit which is suitably configured/programmed to provide the desired functionality described herein using conventional programming/configuration techniques for equipment in wireless telecommunications systems. The transceiver unit 1405 and the controller unit 1407 are schematically shown in FIG. 6 as separate elements for ease of representation. However, it will be appreciated that the functionality of these units can be provided in various different ways following established practices in the art, for example using a single suitably programmed integrated circuit. It will be appreciated the terminal device 1403 will in general comprise various other elements associated with its operating functionality. Operational aspects of the terminal device 1403 which are not described herein may be implemented in accordance with conventional techniques.

A mode of operation whereby the terminal device 1403 controls its acquisition of one of the base stations 1401A, B, C of the wireless telecommunications system 1400 in accordance with an embodiment of the invention will now be described. The base station 1401C is assumed in this example to not support a power boosted operating mode, and as such the operation of this base station may be entirely conventional.

Various examples will be described in which a terminal device controls its acquisition of a base station of a wireless telecommunications system based on information received from one or more base stations regarding the extent to which one or more base stations in the wireless telecommunications system support a power boosted mode of operation. In this respect controlling acquisition may be considered to correspond with controlling a camp-on/cell-attach procedure through which a terminal device receives signalling from a particular base station. The terms acquire and access (and derivatives thereof) may sometimes be used interchangeably throughout this description and should be interpreted accordingly unless the context demands otherwise. In some cases, for example when a terminal device is first switched on, the acquisition may correspond with a cell selection procedure. In other cases, for example where a terminal device is to camp on a different base station, the step of controlling acquisition may correspond with controlling a cell reselection or handover procedure.

By taking account of different base stations' capabilities with regard to the power boosted mode of operation a terminal device may be able to more efficiently control its acquisition of a base station in accordance with embodiments of the invention. For example, if a terminal device relies on power boosting to reliably receive data it might avoid attempting to attach to base stations which do not support a power boosted mode of operation and/or might delay accessing a base station until a later time when power boosting is available for the base station.

In a first example it will be assumed the terminal device 1403 has just been switched on, and needs to determine which of the available base stations 1401A, 1401B, 1401C it will access/camp on. In accordance with standard techniques, a terminal device which is within the coverage area of multiple cells will in these circumstances typically undertake measurements of signalling received from the different cells to establish a measure of radio link conditions for communications from each base station and access one of the base stations based on the measured radio link conditions. However a drawback of this approach is that the terminal device is unaware of the extent to which radio link conditions may be improved because of the availability of power boosting. Thus, in accordance with certain embodiments of the invention terminal devices may receive an indication of the extent to which base stations in the wireless telecommunications network support power boosting to assist in the process of accessing the network through an appropriate base station.

In some embodiments the individual base stations which support the power boosted mode of operation are each configured to implicitly convey their own indication of the extent to which they support the power boost mode to terminal devices. In some examples the indication may be conveyed in association with broadcast signalling received by terminal devices in idle mode. For example, in some cases an indication of the extent to which a base station supports a power boosted mode (i.e. an indication of power boost availability (PBA)) may be implicitly conveyed according to the transmission resources selected by the base station in association with broadcast signalling, such as synchronisation signalling. The power boost availability (PBA) indication might, for example, indicate the level, times of availability, or simply the existence, of power boosting for particular base stations. As already noted, this information can help a terminal device control its acquisition of a base station, for example by governing how the terminal device conducts and responds to signal measurements for cell selection/re-selection, as well as for handover, in order to take account of the potentially improved suitability of a cell that supports power boosting, as well as governing how a terminal device might enter a sleep mode before waking up to connect to a cell for which a PBA indication indicates better coverage might be available at some particular time of day.

More generally, by taking account of different base stations' capabilities with regard to the power boosted mode of operation a terminal device is able to more efficiently control its acquisition of base stations, for example by avoiding attempting to attach to a base station which does not support a power boosted mode of operation if the terminal device requires the power boosted mode of operation to reliably receive data, or by delaying a procedure for accessing a base station until a time when power boosting is indicated as being available for the base station. In this respect controlling access may be considered to correspond with controlling a camp-on/cell-attach procedure through which a terminal device connects to a particular base station. In some cases, for example when a terminal device is first switched on, the access may correspond with a cell selection procedure. In other cases, for example where a terminal device is to move to a different base station, the access may correspond with a cell reselection procedure.

In one example embodiment a base station may provide for repetitions of synchronisation signalling sequences, such as the primary synchronisation sequences (PSS) and secondary synchronisation sequences (SSS) employed in LTE-type networks. As noted above, synchronisation signalling is provided on certain specified transmission resources according to the implemented standard to help a terminal device which has just switched on to easily locate the synchronisation signalling, thereby allowing the terminal device to more rapidly synchronise to transmissions from the base station to help the acquisition of further signalling associated with connecting to a network.

Co-pending UK patent application numbers GB 1305233.7—filed 21 Mar. 2013 [2] and GB 1350234.5—filed 21 Mar. 2013 [3] disclose mechanisms for conveying information regarding a range of Physical Cell Identities (PCI) and/or SSS values that a terminal device searches. This is achieved by varying the subframes or OFDM symbols in which some additional repetition(s) of PSS/SSS occur. A similar approach could be taken in accordance with an embodiment of the invention in which base station wishing to broadcast a particular PBA indication may do so by selecting an appropriate format of synchronisation signalling repetition according to the information to be conveyed. For example, in a simple case the network may allow base stations to simply indicate whether or not the base station is currently able to adopt the power boosted mode. A base station may in effect advertise its capabilities in this respect by introducing a repetition of synchronisation signalling at a pre-specified location in its downlink subframe, for example at a particular time and/or frequency offset relative to conventional synchronisation signalling. A terminal device detecting such a repetition may therefore conclude the base station is advertising its ability to operate in a power boosted mode and take this information into account when taking decisions on how the terminal device is to access the network. It may be noted that a terminal device which requires power boosting to reliably receive, for example, the physical downlink shared channel (PDSCH) in a wireless telecommunications system may nonetheless be able to reliably receive other signalling, such as synchronisation signalling, since this is generally transmitted with a significantly higher degree of redundancy than PDSCH transmissions. Thus, it may be expected that a terminal device which is in a location which makes it difficult to reliably receive PDSCH transmissions may nonetheless reliably receive other signalling.

Different mappings between transmission resources used for broadcast signalling and information regarding power boost capabilities may be established according to a standard. For example, different locations (in the time/frequency domain) for synchronisation signalling repetitions may be associated with different information to be conveyed regarding the extent to which one or more base stations support a power boost mode of operation. A base station may thus establish the extent to which it (or other base stations as discussed further below) is to support the power boost mode, this may be a fixed characteristic of the base station or determined dynamically, for example according to how much disruption the power boost mode of operation would cause for other users of the network, and convey this information implicitly by appropriately selecting transmission characteristics for broadcast signalling, such as synchronisation signalling, according to a pre-established mapping between transmission characteristic and information to be conveyed. As will be appreciated, more "bits" of information (different states) can be communicated by increasing the number of different options a base station may choose from with regards to its broadcast signalling. For example, allowing for potentially more repetitions of synchronisation signalling provides a correspondingly greater number of states that can be distinguished for indicating different extents of power boost availability. A terminal device expecting to need coverage extension on PDSCH/PDCCH to operate reliably can simply choose not to connect to a cell associated with an indication of insufficient availability of power boosting. This saves power at the terminal device and can reduce uplink interference (and therefore re-transmissions) on PRACH since there is a corresponding reduction in terminal devices attempting to acquire cells that are unable to support their power boosted needs.

As noted above, a PBA indication may be selected by a base station to convey various types of information regarding the extent to which one or more base stations support power boosting in the network. For example, depending on the implementation, a PBA indication conveyed from a base station to terminal devices may in accordance with some embodiments be used to indicate one or more of the following:
(i) the availability of any power boosting for one or more base stations;
(ii) the level of any power density boost that is available, for example the power enhancement (e.g. in dB) that is available for resources on which power boosted transmissions may be made relative to the default/nominal power levels available without power boosting.
(iii) time(s) when power boost (or an amount of power boost) can be expected to be available. This could, for example, be based on a fairly coarse division of each day into segments to match the available number of states of the PBA indication mechanism for a given implementation. In one simple example the extent to which a base station supports power boosting may correspond with supporting power boosting at a high boost level (power enhancement) between 00:00-05:30, supporting power boosting at a low boost level between 22:00-00:00, and not supporting any power boosting between 05:30-22:00. This extent of power boost support could be conveyed to a terminal device with a three-states PBA indication. The specific meanings in such a case for 'high' and 'low' (e.g. in terms of actual power level enhancement) could be established in various ways, for example it could be agreed between network operators and terminal device manufacturers outside a standard specification, or it could be written into a standard's specifications.
(iv) on which downlink physical channels power boosting is available (for example, where power boosting may be supported on some downlink physical channels, but not others).

Methods of operation of elements of the wireless telecommunications system 1400 represented in FIG. 6 in accordance with some embodiments of the invention will now be described. In the first examples to be described it will be assumed the terminal device 1403 is initially not connected (attached/camped-on) to any base station.

As is conventional for LTE-type networks, a terminal device in RRC_IDLE mode detects the presence of available base stations/cells and measures their RSRP/RSRQ levels. Based on these measurement results, a base station is selected to which the terminal device will attempt to attach from rankings based on the measurement. Terminal devices use the selected base station/cell for various terminal device procedures, such as receiving paging messages, reading system information (SI), and eventually random access procedures, for example when the terminal device is to move to RRC_CONNECTED mode.

Typically, initial cell selection is performed immediately after a terminal device is powered on. In accordance with standard techniques, a newly switched on terminal device starts to scan its supported bands and select a cell to camp-on based on its preferred operator's network (i.e. PLMN identity in its SIM card) and terminal device measurement results according to established cell selection procedure. Further details on these procedures in the context of an LTE-type network can be found, for example, in the 3GPP document ETSI TS 136 304 V11.2.0 (2013-02)/3GPP TS 36.304 Version 11.2.0 Release 11 [4]

Later cell selection procedures after an initial cell selection procedure are sometimes called "cell reselection" procedure is in LTE. With cell reselection, a terminal device looks for neighbouring cells with better RSRP/RSRQ than its currently-selected cell. The reselection criteria/procedure is considered a separate procedure from (initial) cell selection, but in many respects the principles described herein apply equally for both types of procedure. Further details on cell reselection procedures in the context of an LTE-type network can also be found in ETSI TS 136 304 V11.2.0 (2013-02)/3GPP TS 36.304 Version 11.2.0 Release 11 [4].

As mentioned above the amount of information to be conveyed to terminal devices regarding base stations' capabilities as regards a power boost operating mode may be different in accordance of different implementations. Some examples may employ a simple one-bit indication of whether or not power boosting is available in the cell at all (for example at a fixed predefined level), and this may be referred to as a 'single-level' indication. A single level indication for a given base station may be provided, for example, according to whether or not the base station is broadcasting a synchronisation signalling repetition on a particular transmission resources defined for this purpose. Some other examples may convey more than one-bit of information. For example, the indication of the extent to which a base station supports power boosting might include an indication of which of a number of possible different levels of power boost are being offered by a cell, and this may be referred to as a 'multi-level' indication. The latter may arise, for example, if a cell can change its power boost over time, or if the network as a whole supports more than one power boost level, and per-cell PBA-level indication is therefore desired.

Based on the above two characteristics four different cases may be considered for an idle mode terminal device, namely:

Cell selection with single-level PBA indication
Cell selection with multi-level PBA indication
Cell re-selection with single-level PBA indication
Cell re-selection with multi-level PBA indication Examples of these different cases will now be described. However, as will be appreciated the underlying principles of operation are to large extent the same for each case. In each case it is assumed the terminal device 1403 make use of information received from one or more of the base stations represented in FIG. 6 regarding the extent to which the various base stations support power boosting.

Figure 7:
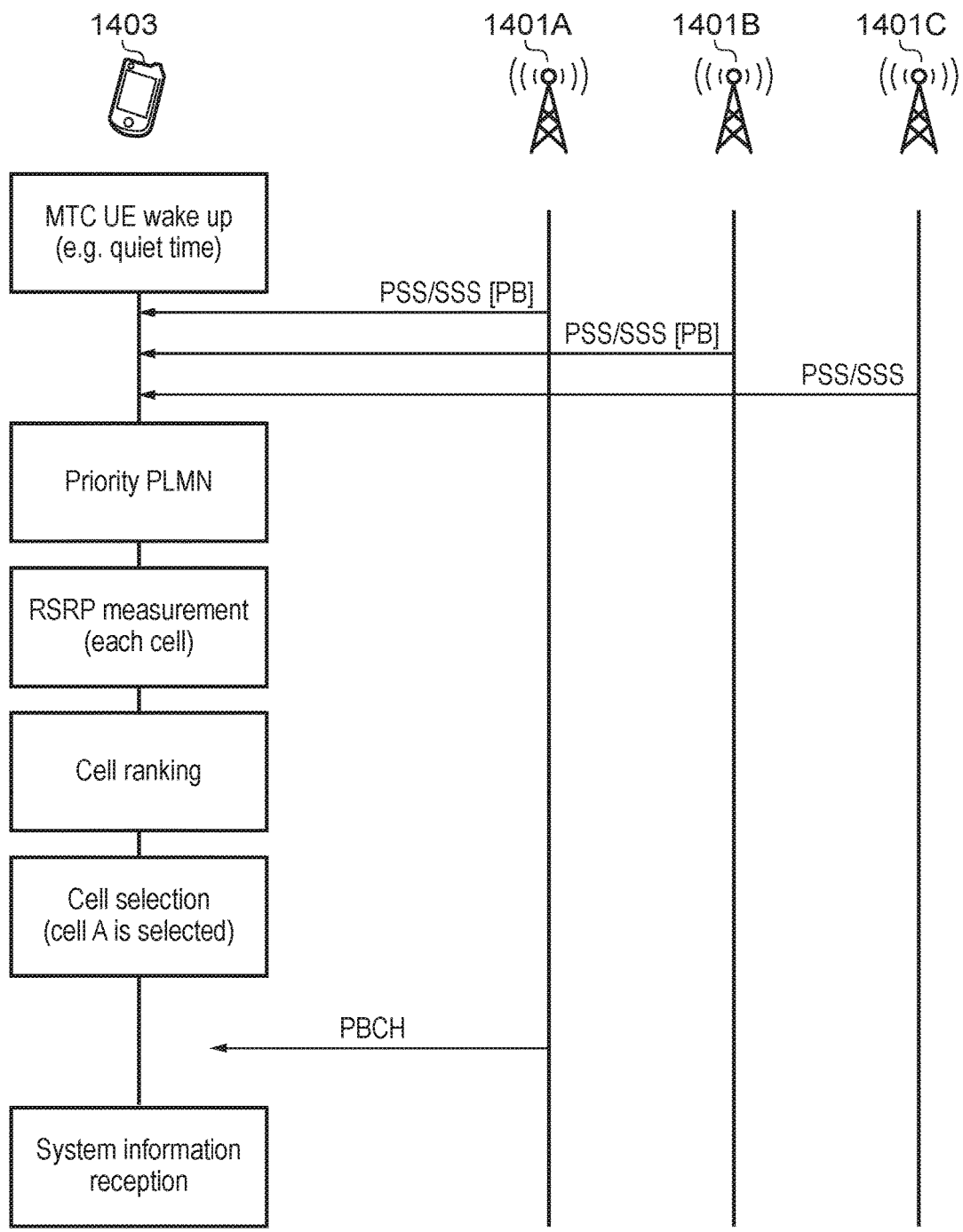
FIG. 7 is a ladder diagram schematically representing some operational aspects of elements of the wireless telecommunication system of FIG. 6 in accordance with some embodiments of the invention.

FIG. 7 is a ladder diagram schematically representing some operational aspects of the terminal device 1403 and the base stations 1401A, B, C of FIG. 6 for an example of initial cell selection with single PBA indication in accordance with an embodiment of the invention. The PBA indication is thus provided simply to identify whether or not the base station supports power boosting. The level of power boosting, for example in terms of a potential power increase in dB for the transmission resources in which power is concentrated when power boosting, may be predefined in accordance with the standards. For example, operating standards associated with the wireless telecommunications system may specify a power boosting mode as comprising a four-fold increase in available power (around 6 dB) within one quarter of the available transmission resources.

Thus, in a first step the terminal device wakes up, for example on initial switch on/after a quiescent period. In accordance with conventional LTE principles, the terminal device scans for synchronisation signalling being broadcast by surrounding base stations. As noted above, it is assumed for the example of FIG. 6 the terminal device is within the nominal coverage area of all three base stations 1401A, B, C. Thus, and as schematically represented in FIG. 7, the terminal device is able to receive primary (PSS) and secondary (SSS) signalling from each of the base stations. In accordance with the principles described above, the respective base stations which support power boosting are configured to indicate this by making transmissions in association with their synchronisation signalling (e.g. signalling repetitions) on transmission resources specifically defined for this purpose. This is schematically represented in FIG. 7 for the base stations which support power boosting (i.e. base stations 1401A and 1401B) by the labelling "[PB]" associated with the representation of their PSS/SSS signalling. A base station which does not support power boosting (such as base station 1401C) does not make transmissions associated with synchronisation signalling on the pre-defined transmission resources, thereby in effect indicating its inability to use power boosting.

The terminal device 1403 is configured to search for synchronisation signalling repetitions on the transmission resources defined for indicating the availability of power boosting, and if such synchronisation signalling is found, the terminal device 1403 determines the corresponding base station supports power boosting. Thus the terminal device 1403 determines that the base stations 1401A and 1401B support power boosting, whereas the base station 1401C does not. Thus, the terminal device 1403 reaches a stage at which it has identified what base stations are in range and which of them support power boosting.

In the next two stages represented in FIG. 7, the terminal device 1403 establishes which base stations correspond with its preferred (priority) PLMN and makes RSRP measurements for each base station. Here it is assumed that all three base stations correspond with the terminal device's preferred PLMN, and so RSRP measurements are undertaken for each base station/cell. These two stages may be performed in accordance with conventional techniques.

Having obtained the RSRP measurements, and taking account of the information previously-received regarding the extent to which the various base station support power boosting, the next stages of operation for the terminal device 1403 represented in FIG. 7 are a cell ranking stage and a cell selection stage. In these stages the terminal device controls how it will subsequently access a base station of the wireless telecommunications system by determining which of the available base stations is most appropriate for connecting to, taking account of the RSRP measurements and abilities to support power boosting for the respective base stations.

In general, the cell ranking stage may follow the same general principles as for a conventional cell attach procedure, except that in addition to taking account of the RSRP measurements, account is also taken of the extent to which the base station support power boosting. One way to do this is to in effect uprate the RSRP measurements for base stations which support power boosting. For example reference signal received power measurements (RSRP) for base stations which support power boosting may be replaced for the purpose of cell ranking with a modified RSRP corresponding to the measured RSRP plus and offset corresponding to the available power boosting enhancement. For example, if the specification defines power boosting as corresponding to a 6 dB enhancement, the RSRP measurements for base stations which indicate they support power boosting may be increased by 6 dB. The modified RSRP thus reflects the channel characteristics that may be achievable when power boosting is active for a given base station.

For example, if the terminal device 1403 were to determine the RSRP measurements for base station 1401C (which does not support power boosting) were 2 dB higher than for base station 1401A (which does support power boosting) and 3 dB higher than for base station 1401B (which also supports power boosting), the terminal device would in accordance with conventional cell selection techniques determine that base station 1401C should be preferred for the purposes of accessing the network. However, in accordance with an embodiment of the invention, the terminal device can recognise at this early stage in the attach procedure that base station 1401A in fact has the potential for higher received signal powers because it has provided an indication of the potential for a 6 dB power enhancement through power boosting. Thus, in accordance with an embodiment of the invention, the terminal device may instead determine that base station 1401A is in fact the first base station through which to access the network. This is schematically represented in FIG. 7 by the indication that cell A is selected at the cell selection stage.

Having selected a base station (cell) through which to access the network in accordance with an embodiment of the invention, the terminal device 1403 may proceed in line with conventional techniques. Thus, as schematically represented in FIG. 7, the base station may proceed to receive and decode the physical broadcast channel (PBCH) transmitted by the selected base station, in this case base station 1401A serving cell 1404A, and follow the remainder of the camp on procedure schematically represented in FIG. 5 to derive system information, and so forth.

Thus, in accordance with the techniques described above with reference to FIG. 7, the terminal device is able to avoid undertaking an unnecessary camp on procedure for base station 1401C which might happen to be associated with the highest RSRP, but which ultimately may not be able to reliably support communications with the terminal device because it does not support power boosting.

Figure 8:
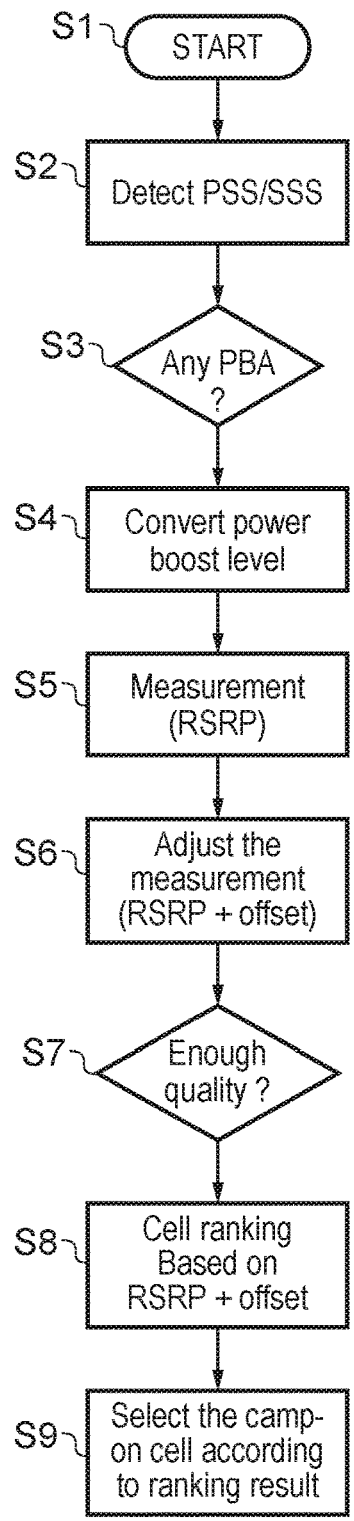
FIG. 8 is a flow diagram schematically representing some operational aspects of a terminal device in accordance with some embodiments of the invention.

FIG. 8 is a flow diagram schematically representing some aspects of the operation of the terminal device 1403 in accordance with an implementation of an embodiment of the invention as described above with reference to FIG. 7. Steps S2 to S6 are shown as representing steps associated with one base station, but it will be appreciated that corresponding steps are performed for other base stations that are in range of the terminal device. Steps corresponding to steps S2 to S6 may thus be performed for multiple base stations, either in series, parallel or interleaved manner.

Processing starts in a step S1, for example when the terminal device is initially switched on.

In step S2 the terminal device detects synchronisation signalling from a base station in range.

In step S3 the terminal device determines whether the signalling received from the base station comprises an indication of an availability of power boosting.

In step S4 the terminal device determines a power boost level corresponding to the extent to which power boosting is indicated as being available for the base station. For example, if no power boost indication is associated with the synchronisation signalling for this particular base station, the terminal device may identify there is 0 dB power boost available for the base station (e.g. as for base station 1401C in FIG. 6). If, on the other hand, the terminal device determines there is an indication that the base station supports power boosting, the indication may be converted into a corresponding power boost level. For example, a fixed potential power boost level of 6 dB in the case of the example provided above. The power boost level may, for example be referred to as an offset.

In step S5 the terminal device undertakes RSRP measurements for the base station.

In step S6 the terminal device adjusts the measured RSRP for the base station to take account of the potential power boost enhancement (offset) established in step S4. For example, a modified RSRP corresponding to the measured RSRP plus the available power boost level may be determined.

In step S7 the terminal device determines from reference signalling measurements, taking account of any potential improvement from power boosting, whether or not the base station base station meets certain minimum requirements for selection. If a base station fails to meet these requirements, it may be discounted from any further consideration. If, on the other hand, a base station meets these requirements, it may remain as a candidate for selection. The minimum selection criterion may broadly correspond with those applied in a conventional LTE networks but modified to take account of what, if any, power boosting is indicated as available for the base station under consideration.

Thus, a base station may be considered to meet the minimum selection criterion if both the following inequalities are satisfied:

$$\text{RSRP+Offset} > (Q_{rxlevmin} + Q_{rxlevminoffset}) + \text{Pcompensation} \quad \text{(Eqn. 1)}$$

$$\text{RSRQ+Offset} > (Q_{qualmin} + Q_{qualminoffset}) \quad \text{(Eqn. 2)}$$

It will be recognised these inequalities closely correspond with tests applied for cell selection in a conventional LTE type network, for example as described in the 3GPP document ETSI TS 136 304 V11.2.0 (2013-02)/3GPP TS 36.304 Version 11.2.0 Release 11 [4]. In each case, it is only the left-hand side of the inequality that is different. For a conventional LTE approach the left-hand side of these inequalities would respectively correspond simply to RSRP (for Equation 1) and RSRQ (for Equation 2), whereas in accordance with embodiments of the invention, the left-hand side of the inequalities are modified to take account of the potential improvements (offsets) associated with the level of the available power boosting. For example in both cases the offset might be 6 dB in accordance with an embodiment of the invention. The various parameters listed on the right hand side of the above inequalities are defined in the relevant standards, for example in 3GPP TS 36.304 Version 11.2.0 Release 11 [4] where they are defined according to the following table (see Section 5.2.3.2):

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value RSRQ |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [6] |
| $P_{PowerClass}$ | Maximum RF output power of the UE (dBm) according to the UE power class as defined in [6] |

Although Equations 1 and 2 show the left-hand sides of the inequalities being increased by the relevant offset, the same test result can of course be achieved by having the right hand sides reduced by the respective offsets.

In step S8 the terminal device in effect ranks the various base stations that have been considered and which meet the quality test of step S7 according to the modified values of RSRP (i.e. measured RSRP plus the level of available power boosting offset). Thus, the terminal device may select the base station for which the modified RSRP value is highest as the base station with which the terminal device is to continue an attach procedure.

In step S9 the terminal device proceeds with attaching to the selected cell/base station. Once the desired cell is selected, the attach (camp on) procedure may continue as normal.

It will be appreciated that in other embodiments of the processing represented in FIGS. 7 and 8 may be subject to modification. For example, in some implementations it may be decided that a terminal device should never attempt to camp on a base station that does not support power boosting. In this case, if a terminal device determines in a step corresponding to step S3 in FIG. 8 that no power boosting is available for a particular base station, the base station may be discarded from any further consideration.

Thus, in accordance with an embodiment of the invention as described above, a terminal device is provided with an early indication of the extent to which base stations to which the terminal device may consider attaching support power boosting, thereby allowing the terminal device to take account of this information when determining the most appropriate base station through which to connect to the network.

While the example represented in FIGS. 7 and 8 is in effect based around a single bit indication regarding the extent to which base station support power boosting (i.e. whether not they do support power boosting), in other examples more information may be conveyed. As noted above, this may be referred to as a multi-level approach. For example, in accordance with certain embodiments different base stations may support different levels of power boosting. For example, one base station may only allow for power boosting up to 3 dB, while another base station may allow power boosting up to 9 dB. Different predefined arrangements of transmission resources for broadcast signalling repetitions may be associated with different power boost levels. Thus, a base station can establish the extent to which it will support power boosting (for example whether at 3 dB or at 9 dB, or whichever other values might be available for a given implementation), and convey this to terminal devices through an appropriate selection of transmission resources for synchronisation signalling. For example, one approach may allow for four states of power boost availability to be indicated (e.g. based on the selective presence or absence of two signalling repetitions) corresponding to power boost levels of 0 dB, 3 dB, 6 dB and 9 dB. Individual base stations may establish the power boost level they are to support either based on fixed configuration information, or dynamically based on current traffic. For example a relatively congested base station may determine that it should not apply any power boosting because this will reduce its ability to serve other terminal devices. However, a base station which is relatively lightly loaded may determine that it can operate using the maximum power boost mode for certain terminal devices without significantly impacting its overall operation for other terminal devices.

A multi-level approach may follow generally the approach of FIGS. 7 and 8 except the terminal device may determine a different power boost enhancement/offset for different base stations according to the indications provided in association with their synchronisation signalling. The cell ranking procedure may then correspondingly take account of the different power boost levels available for the different base stations when determining the most appropriate base station to access and whether particular base stations are able to meet the minimum selection requirements.

The examples described above with reference to FIGS. 7 and 8 have primarily focused on an initial cell acquisition process (cell selection). However, as noted above, broadly similar principles can apply during a cell reselection process. For example when an idle mode terminal device is already camped on an initial cell/base station, it may be appropriate to consider moving to another cell, for example because the quality of signalling associated with the initial cell has deteriorated. A terminal device may perform a cell reselection procedure taking account of the extent to which different base stations offer power boosting using what are in effect the same selection processes as described above for initial cell selection. However, it may also be noted that for cell reselection the terminal device has already camped on to a base station of the network and so will have had access to system information. Thus in accordance with some embodiments of the invention, information conveyed in system information may be used to provide an indication of the extent to which different base stations support power boosting in the network to assist terminal devices control their acquisition of base stations. This type of approach may be provided in conjunction with the implicit signalling approach described above or may be provided on its own independently of an implicit approach.

Thus, in accordance with some embodiments the concept of a list of which base stations support power boosting within a wireless telecommunications system, and potentially characteristics of the power boosted they offer, for example in terms of power boost level, times during which power boosted available, and so forth, may be introduced. This may conveniently be referred to as a white list for power boost availability. The list may, for example, be broadcast by the base station in association with system information normally received by terminal devices attached to the base station. Thus, terminal devices which are already connected to a station may be readily provided with information regarding the extent to which other base stations in the network support power boosting. This information can assist terminal devices determine whether to move to another base station by allowing terminal devices to take account of what improvements in radio link conditions might be expected to be achievable over measured channel conditions for various base stations according to the availability of power boosting. The following table represents an example power boost availability white list linking communication cell identities (PCIs) to example levels of power boost supported by the respective cells.

| Cell ID | power boost |
|---------|-------------|
| 43      | 3 dB        |
| 432     | 6 dB        |
| 124     | 9 dB        |
| 156     | 6 dB        |

Each base station may be configured to maintain the white list for communication to their connected terminal devices. The list may be maintained (semi)dynamically based on communications between base stations regarding their intended support for power boosting, for example using the X2 interface between base stations using newly-defined extra information elements. For an example, individual base stations may communicate to neighbouring base stations using X2 signalling when they change their support for the power boosted mode. Alternatively, the list may be (semi) static based on an operator selected network configuration. Thus, when a terminal device in idle mode measures the RSRP/RSRQ of Cell ID 432 it may modify the measurements to account for the potential 6 dB power boost improvement offered by cell ID 432, and so forth.

Thus, in accordance with some embodiments, a serving cell to which a terminal device has already connected may provide a PBA indication relevant for a neighbouring cell or cells. If a terminal device is connected to the serving cell (possibly, but not necessarily, after deciding to connect in a manner taking account of indications of power boost availability such as described above), RRC configuration signalling can be used to convey PBA indications relevant for other base station(s)/cell(s). A terminal device can then use this information to judge whether, and potentially when, to try to acquire a neighbouring cell. The terminal device may, for example, determine that it would be preferable to abandon the serving cell and attach to a neighbour cell if the neighbour is reported as being able to offer better service taking account of the availability of power density boosting. This could be achieved through an explicit request made to the currently serving cell which could then initiate a handover (HO) procedure or, if uplink coverage is too poor in the serving cell, by simply commencing a new cell acquisition procedure on the neighbour cell.

In a variation of this approach where PBA indications contain information regarding the time(s) of day at which one or more base stations/cells can offer power density boosting, a terminal device may control its access to the network by deciding to enter a power saving state, perhaps amounting to a switch-off until a time at which power density boosting is available. The terminal device can then wake up at the relevant time and connect to the power-boosting cell. This could represent a significant power saving advantage for the terminal device.

As noted above, neighbour cell PBA information can also be provided to idle terminal devices by including relevant information in the System Information (SI) broadcasts. Idle-mode terminal devices check periodically for SI changes by checking a configured pattern of subframes for a paging PDCCH which identifies the PDSCH resources in which the SI is held in the subframe. This provides a mechanism for idle mode terminal devices to receive explicit signalling regarding one or more base stations' capabilities as regards power boosted operation It may be noted that in principle a particular cell identity could be associated with a negative power boost level. This would have the effect of discouraging terminal devices from camping on to this cell even if the cell provides good RSRP/RSRQ measurements without any power boosting, thereby providing a mechanism for controlling traffic levels.

A simpler version of a PBA whitelist might simply indicate cell IDs that are able to provide PBA at a pre-defined (e.g. specified or agreed) level. This approach is broadly equivalent to the 'single level' indication approach described above.

It will be appreciated that a conventional LTE network allows for the definition of so-called white-lists and black lists of PCIs. A white list is a list of PCIs for which a terminal device is required to make reference signal measurements, and other cells may also be measured. A black list instructs a terminal device not to measure any black-listed PCIs for neighbour cell reselection. The configurations of these PCI white and black lists are sent via RRC (Radio Resource Control) signalling as part of the RRM (Radio Resource Management) configurations. The black list may be used to prevent a terminal device from reselecting to specific intra- and inter-frequency neighbouring cells. This existing white and black this functionality can complement the power boost availability white list concepts described herein.

The above-described embodiments have focused primarily on methods of operation in accordance with embodiments of the invention for a terminal device in an idle mode. However, corresponding principles may be applied where a terminal device is in a connected mode, for example to assist handover procedures.

When a terminal device is in RRC_CONNECTED mode, such that mobility is under control of E-UTRAN, with assistance from terminal device measurements, etc., a whitelisting approach similar to that discussed above may be adopted to in effect improve the relevance of the RRM measurements sent to the base station to ensure that handover decisions take account of information regarding the extent to which different base stations support power boosting (and black lists can operate as normal also). Similarly to in the RRC_IDLE case, this can help avoid terminal devices making unnecessary reports for base stations/cells that the terminal device can detect, but which are not in its white-list and cannot support its coverage needs.

Figure 9:
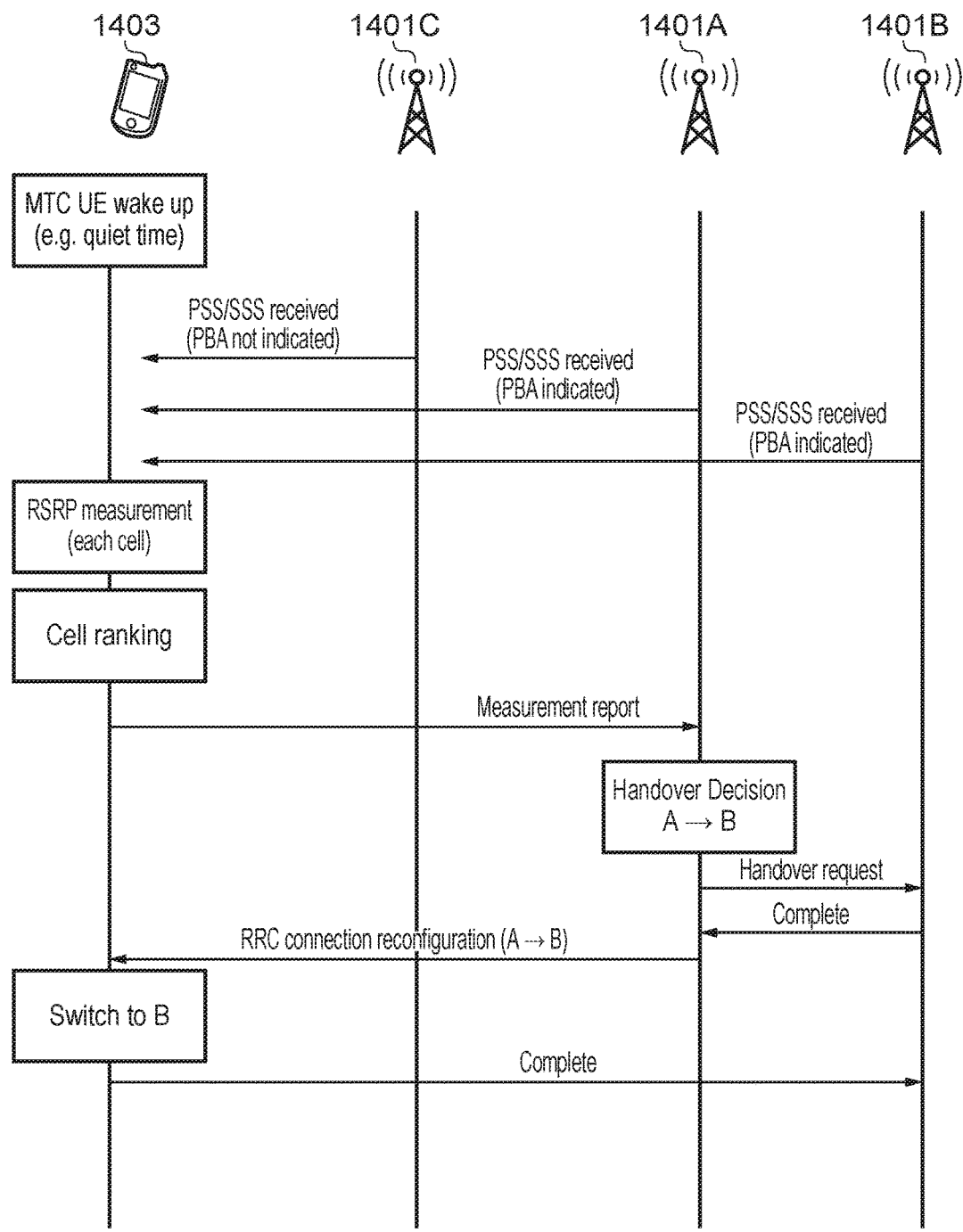
FIG. 9 is a ladder diagram schematically representing some operational aspects of elements of the wireless telecommunication system of FIG. 6 in accordance with some embodiments of the invention.

FIG. 9 is a ladder diagram schematically representing some operational aspects of the terminal device 1403 and the base stations 1401A, B, C of FIG. 6 for an example embodiment of the invention in which the terminal device is assumed to be in RRC connected mode with base station 1401A.

In a first step the terminal device wakes up after a quiescent period. In accordance with conventional LTE principles, the terminal device scans for synchronisation signalling being broadcast by base stations with a view to establishing whether it would be appropriate to handover to another base station. As noted above, it is assumed for the example arrangement of FIG. 6 the terminal device is within the nominal coverage area of all three base stations 1401A, B, C. Thus, and as schematically represented in FIG. 9, the terminal device is able to receive primary (PSS) and secondary (SSS) signalling from each of the base stations. In accordance with the principles described above, the respective base stations which support power boosting are configured to indicate this by making transmissions in association with their synchronisation signalling (e.g. signalling repetitions) on transmission resources specifically defined for this purpose. This is schematically represented in FIG. 9 for the base stations which support power boosting (i.e. base stations 1401A and 1401B) by the labelling "PBA indicated" associated with the representation of their PSS/SSS signalling. A base station which does not support power boosting (such as base station 1401C) does not make transmissions associated with synchronisation signalling on the pre-defined transmission resources, thereby in effect indicating its inability to use power boosting (as represented in FIG. 9 by the labelling "PBA not indicated" for the PSS/SSS signalling from base station 1401C).

In a manner similar to the embodiments described above, the terminal device 1403 is configured to search for synchronisation signalling repetitions on the transmission resources defined for indicating the availability of power boosting, and if such synchronisation signalling is found, the terminal device 1403 determines the corresponding base station supports power boosting. Thus the terminal device 1403 determines that the base stations 1401A and 1401B support power boosting, whereas the base station 1401C does not. Thus, the terminal device 1403 reaches a stage at which it has identified what base stations are in range and which of them support power boosting.

In the next two stages represented in FIG. 9 the terminal device 1403 establishes which base station has the potential (taking account of power boosting availability) for providing the optimum channel conditions. This is based on RSRP measurements for each base station and a ranking process that takes account of the availability of power boosting for the respective base stations. These stages may be performed in broadly the same manner as for the corresponding steps of FIG. 7.

In the example of FIG. 7 (cell selection from RRC idle) the terminal device determines from the cell ranking procedure which base station it will proceed to camp on. However, in the example of FIG. 9 the terminal device is already connected to base station 1401A. Thus after the cell ranking stage represented in FIG. 9, the terminal device proceeds with sending a measurement report to the base station 1401A regarding the RSRP measurements that have been made for the neighbouring cells. In general the procedures and format for sending this report may follow established practices for LTE type networks. However, a significant difference from conventional schemes in this example embodiment is that the measurement report sent from the terminal device 1403 to the base station 1401A will based on RSRP measurements which have been modified to take account of the availability of power boosting (e.g. by adding an offset based on the indicated over the power boosting) in accordance with the principles described above.

When the base station 1401A to which the terminal device 1403 is camped on receives the measurement report, it may proceed as normal to determine whether or not to handover the terminal device to another base station. That is to say, from the point of view of the base station the handover procedure may be conventional. That is to say, it does not matter for the subsequent procedure that the handover decision is being based on modified (as opposed to actual) RSRP measurements received from the terminal device 1403.

In this example it is assumed the measurement report from the terminal device indicates that base station 1401B is associated with better operating conditions for the terminal device 1403, or at least it would be when using the power boosting it can support. Accordingly, the base station 1401A makes a decision to handover the terminal device to base station 1401B as schematically represented in the next stage of FIG. 9. In accordance with established techniques, the base station 1401A (handover source cell), the base station 1401B (handover target cell), and the terminal device 1403 exchange signalling to allow the terminal device to switch to our syndicated mode with base station 1401B and report when this is complete, as schematically represented in FIG. 9.

In a variation of the approach of FIG. 9, the respective base stations might not communicate an indication of the extent to which they support power boosting to the terminal device. The terminal device may therefore make RSRP measurements and provide a measurement report in accordance with conventional techniques. The base station to which the terminal device is RRC connected may then make a handover decision based on the conventional RSRP measurements reported by the terminal device in conjunction with information regarding the extent to which neighbouring base stations support power boosting. That is to say, the base station itself may be responsible for in effect modifying the RSRP measurements received from the terminal device to take account of available power boosting in neighbouring cells. For example, the base station may add an appropriate power offset to the RSRP measurements associated with the other base stations based on information received from other stations, for example over X2 signalling as discussed above, regarding their ability to support power boosting.

Although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, terminal device etc. Furthermore, although the term base station has been used interchangeably with eNodeB it should be understood that there is no difference in functionality between these network entities.

Thus, a wireless telecommunication system is described which comprises base stations for communicating with terminal devices. One or more base stations support a power boost operating mode in which a base station's available transmission power is concentrated in a subset of its available transmission resources to provide enhanced transmission powers as compared to transmission powers on these transmission resources when the base station is not operating in the power boost mode. A base station establishes an extent to which one or more base stations in the wireless telecommunications system support the power boost operating mode conveys an indication of this to a terminal device. The terminal device receives the indication and uses the corresponding information to control its acquisition of a base station of the wireless telecommunication system, for example by taking account of which base stations support power boosting and/or when power boosting is supported during a cell attach procedure.

Embodiments of the invention can thus allow a network operator to provide for additional information to be conveyed to terminal devices as regards the suitability of different cells for meeting the terminal devices' needs. This can help to reduce wasted connection attempts by the terminal device. This can in turn reduce power wastage at the terminal, and could reduce uplink interference on PRACH since in general fewer terminal devices may attempt to acquire certain cells. The configurable nature of approached in accordance with embodiments of the invention means that an operator might enable coverage extension (power boosting) only at selected times of the day, for example to provide a balance between cell efficiency and coverage, rather than having to always tolerate some degree of sacrifice, and thus inefficient resource and power use, for both. In RRC_IDLE, a terminal device may be able to avoid choosing to camp on a cell which will not be able to support it when the terminal device eventually becomes RRC_CONNECTED. The terminal device is therefore able to avoid the power wastage of listening for paging and SI on such cells. Such cells also need not be stored in the typically limited space for the list of candidate cells for cell re-selection.

Embodiments of the invention can also allow a terminal device (UE) to sleep for relatively long periods of time, and to only wake up when the network has indicated it will be able to serve it efficiently (because power boosting will be available), again offering the potential for significant reductions in power consumption. These consequences may be particularly relevant in some MTC scenarios where a terminal device may be in an inaccessible location and may have a limited battery life.

Embodiments of the present disclosure may be applied in a wireless telecommunications system supporting virtual carrier modes of operation. A virtual carrier represents a restricted subset of downlink transmission resources within the overall transmission resource grid associated with a host carrier which may be used for communicating at least some information with certain types of terminal devices, for example, reduced capability machine type communication terminal devices. Thus, virtual carrier operation may be summarised as an approach in a wireless telecommunications system in which downlink communications are made by a base station using a radio interface that spans a system frequency bandwidth and a terminal device is configured to receive at least some communications from the base station within a restricted subset of transmission resources selected from within the system frequency bandwidth and comprising a restricted bandwidth downlink channel having a channel bandwidth which is smaller than the system frequency bandwidth.

A primary driver for some types of terminal device, for example MTC devices, will be a desire for such devices to be relatively simple and inexpensive. For example, the type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in GB 2 487 906 [7]. GB 2 487 908 [8], GB 2487 780 [9]. GB 2 488 513 [10], GB 2 487 757 [11], GB 2 487 909 [12]. GB 2 487 907 [13] and GB 2 487 782 [14]. One principle underlying the concept of a virtual carrier is that a frequency subregion (subset of frequency resources) within a wider bandwidth (greater range of frequency resources) host carrier is configured for use as a self-contained carrier for at least some types of communications with certain types of terminal device. For example, a terminal device may be configured to receive at least some communications from the base station within a restricted subset of transmission resources selected from within the system frequency bandwidth whereby the restricted subset of transmission resources comprises a downlink channel having a channel bandwidth which is smaller than the system frequency bandwidth.

In some virtual carrier implementations, such as described in references [7] to [14], all downlink control signalling and user-plane data for terminal devices using the virtual carrier may be conveyed within the subset of frequency resources associated with the virtual carrier. A terminal device operating on the virtual carrier is made aware of the restricted frequency resources and need only receive and decode a corresponding subset of transmission resources to receive data from the base station. One advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal received.

Other virtual carrier approaches for reducing the required complexity of devices configured to communicate over LTE-type networks are proposed in GB 2 497 743 [15] and GB 2 497 742 [16]. These documents propose schemes for communicating data between a base station and a reduced-capability terminal device whereby physical-layer control information for the reduced-capability terminal device is transmitted from the base station using subcarriers selected from across a full host carrier frequency band (as for conventional LTE terminal devices). However, higher-layer data for reduced-capability terminal devices (e.g. user-plane data) is transmitted using only subcarriers selected from within a restricted subset of carriers which is smaller than and within the set of subcarriers comprising the system frequency band. Thus, this is an approach in which user-plane data for a particular terminal device may be restricted to a subset of frequency resources (i.e. a virtual carrier supported within the transmission resources of a host carrier), whereas control signalling is communicated using the full bandwidth of the host carrier. The terminal device is made aware of the restricted frequency resource, and as such need only buffer and process data within this frequency resource during periods when higher-layer data is being transmitted. The terminal device buffers and processes the full system frequency band during periods when physical-layer control information is being transmitted. Thus, the reduced-capability terminal device may be incorporated in a network in which physical-layer control information is transmitted over a wide frequency range, but only needs to have sufficient memory and processing capacity to process a smaller range of frequency resources for the higher-layer data. This approach may sometimes be referred to as a "T-shaped" allocation because the area of the downlink time-frequency resource grid to be used by the reduced-capability terminal device may in some cases comprise a generally T-shape.

Virtual carrier concepts thus allow terminal devices having reduced capabilities, for example in terms of their transceiver bandwidth and/or processing power, to be supported within LTE-type networks.

In some wireless telecommunications systems it can be expected that terminal devices reliant on power boosting modes of operation may also rely on virtual carrier modes of operation. It may also be expected that in some wireless telecommunications systems, some base stations may support virtual carrier operating modes, whereas some a stations may not support virtual carrier operating modes. Therefore, in some example embodiments of the present disclosure it can also be helpful for a terminal device to be made aware of whether or not base stations to which it might seek to connect/attach support virtual carrier mode of operation. This is to help avoid a terminal device that relies on virtual carrier operation seeking to attach to a base station that does not support a virtual carrier mode of operation. In many respects this issue mirrors the issues described above for helping to avoid a terminal device that relies on power boost operation seeking to attach to a base station that does not support a power boost mode of operation. In this regard, it will be appreciated many of the comments provided above in the context of power boosting operations apply equally in the context of virtual carrier operations.

Thus certain embodiments of the invention may be directed to schemes for providing terminal devices with information on base stations' capabilities to operate in a virtual carrier mode (e.g. in terms of if/when a base station supports virtual carrier operation) with a view to reducing wasted camp on attempts. A terminal device may thus control its acquisition of a base station of a wireless telecommunications system based on information received from one or more base stations regarding the extent to which one or more base stations in the wireless telecommunications system support a virtual carrier mode of operation. By taking account of different base stations' capabilities with regard to the virtual carrier mode of operation a terminal device may be able to more efficiently control its acquisition of a base station in accordance with embodiments of the disclosure. For example, if a terminal device relies on virtual carrier operation it might avoid attempting to attach to base stations which do not support virtual carrier operation and/or might delay accessing a base station until a later time when virtual carrier operation is available for the base station.

As described above, in accordance with certain embodiments of the present disclosure, a base station may be configured to provide a terminal device with information regarding the extent to which neighbouring base stations support power boosting. Similarly, in accordance with certain other embodiments, a base station may, in addition or in the alternative, be configured to provide a terminal device with information regarding the extent to which one or more neighbouring base stations support virtual carrier operations.

As noted above, when an idle mode terminal device is already camped on an initial cell/base station, it may be appropriate to consider moving to another cell, for example because the quality of signalling associated with the initial cell has deteriorated and/or the device has changed location (i.e. due to mobility). A terminal device may in accordance with embodiments of the present disclosure perform a cell reselection procedure taking account of the extent to which different base stations offer virtual carrier operation. For cell reselection the terminal device has already camped on to a base station of the network and so will have had access to system information. Thus in accordance with some embodiments of the invention, information conveyed in system information may be used to provide an indication of the extent to which different base stations support virtual carrier operation in the network to assist terminal devices control their acquisition of base stations. This type of approach may be provided in conjunction with the signalling approaches for conveying information regarding the abilities of base stations to support power boosting such as described above (whether implicit or through system information), or may be provided independently of this. That is to say, the approaches described herein for conveying power boost indications (i.e. indications of the extent to which base stations support power boost modes of operations) may equally be adopted for conveying virtual carrier indications (i.e. indications of the extent to which base stations support virtual carrier modes of operations), and this may be done in conjunction with, or separately and independent from, any conveying of power boost indications. Indeed, approaches for conveying indications of the extent to which one or more base stations support virtual carrier modes of operations as described herein may be implemented in a wireless telecommunication system that does not support power boost operations, and vice versa.

Thus, in accordance with some embodiments the concept of a list of which base stations support virtual carrier operation within a wireless telecommunications system, and potentially characteristics of the virtual carrier operation they offer, for example in terms of frequency resources used for virtual carrier operation, times during which virtual carrier operation is available, and so forth, may be introduced. This may conveniently be referred to as a white list for virtual carrier availability. The list may, for example, be broadcast by the base station in association with system information normally received by terminal devices attached to the base station. Thus, terminal devices which are already connected to a station may be readily provided with information regarding the extent to which other base stations in the network support virtual carrier operation. This information can assist terminal devices determine whether to move to another base station by allowing terminal devices to take account of whether the other base station can support the terminal device in a virtual carrier operating mode. The following table represents an example virtual carrier availability white list linking communication cell identities (PCIs) to an indication of whether or not the respective cells support virtual carrier operations.

| Cell ID | Virtual carrier operation? |
|---------|---------------------------|
| 43      | Yes                       |
| 432     | No                        |
| 124     | No                        |
| 156     | Yes                       |

Each base station may be configured to maintain the white list for communication to their connected terminal devices. The list may be maintained (semi)dynamically based on communications between base stations regarding their support for a virtual carrier operation, for example using the X2 interface between base stations using newly-defined extra information elements. For an example, individual base stations may communicate to neighbouring base stations using X2 signalling should they change their support for a virtual carrier operation. Alternatively, the list may be (semi)static based on an operator selected network configuration. Thus, when a terminal device in idle mode measures the RSRP/RSRQ of Cell ID 432 it may determine the cell is associated with good channel conditions, but should nonetheless be avoided because it does not (currently) support virtual carrier operations.

Thus, in accordance with some embodiments, a serving cell to which a terminal device has already connected may provide a VC (virtual carrier) indication relevant for a neighbouring cell or cells. If a terminal device is connected to the serving cell (possibly, but not necessarily, after deciding to connect in a manner taking account of indications of power boost availability such as described above), RRC configuration signalling can be used to convey VC indications relevant for other base station(s)/cell(s).

As noted above in the context of conveying neighbour cell power boosting information, neighbour cell VC information can also be provided to idle terminal devices by including relevant information in the System Information (SI) broadcasts. Idle-mode terminal devices check periodically for SI changes by checking a configured pattern of subframes for a paging PDCCH which identifies the PDSCH resources in which the SI is held in the subframe. This provides a mechanism for idle mode terminal devices to receive explicit signalling regarding one or more base stations' capabilities as regards virtual carrier operations.

A simpler version of a VC whitelist might simply indicate cell IDs that are able to support virtual carrier operations (or conversely, which cell IDs are unable to support virtual carrier operations).

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma. H. and Toskala. A, "LTE for UMTS OFDMA and SC-FDMA based radio access". John Wiley and Sons, 2009
[2] GB 1305233.7—filed 21 Mar. 2013
[3] GB 1305234.5—filed 21 Mar. 2013
[4] ETSI TS 136 304 V11.2.0 (2013-02)/3GPP TS 36.304 Version 11.2.0 Release 11
[5] ETSI TS 123 122 V11.4.0 (2013-01)/3GPP TS 23.122 Version 11.4.0 Release 11

[6] ETSI TS 136 101 V11.3.0 (2013-02)/3GPP TS 36.101 Version 11.3.0 Release 11
[7] GB 2 487 906 (UK patent application GB 1101970.0)
[8] GB 2 487 908 (UK patent application GB 1101981.7)
[9] GB 2 487 780 (UK patent application GB 1101966.8)
[10] GB 2 488 513 (UK patent application GB 1101983.3)
[11] GB 2 487 757 (UK patent application GB 1101853.8)
[12] GB 2 487 909 (UK patent application GB 1101982.5)
[13] GB 2 487 907 (UK patent application GB 1101980.9)
[14] GB 2 487 782 (UK patent application GB 1101972.6)
[15] GB 2 497 743 (UK patent application GB 1121767.6)
[16] GB 2 497 742 (UK patent application GB 1121766.8)

The invention claimed is:

1. A method of operating a base station in a wireless telecommunication system comprising one or more base stations which support a narrowband carrier operating mode in which at least some downlink communications are made using a narrowband carrier formed of a restricted subset of transmission resources selected from within a system frequency bandwidth and comprising a restricted bandwidth downlink channel having a channel bandwidth which is smaller than the system frequency bandwidth, the method comprising:
establishing an extent to which the base station and at least one neighboring base station support the narrowband carrier operating mode; and
conveying an indication of the extent to which the base station and the at least one neighboring base station support the narrowband carrier operating mode to a terminal device operating in the wireless telecommunication system so the terminal device can take account of the indication of the extent to which the base station and the at least one neighboring base station support the narrowband carrier operating mode for controlling its acquisition of a base station of the wireless telecommunication system.

2. The method of claim 1, wherein
the terminal device is connected to the base station and is not connected to the at least one neighboring base station.

3. The method of claim 1, further comprising:
receiving from at least one further base station an indication of the extent to which the at least one further base station supports the narrowband carrier operating mode in the wireless telecommunication system.

4. The method of claim 1, wherein
the indication of the extent to which the base station and the at least one neighboring base station support the narrowband carrier operating mode is conveyed to the terminal device using explicit signalling.

5. The method of claim 4, wherein
the explicit signalling comprises system information signalling.

6. A base station for use in a wireless telecommunication system comprising one or more base stations which support a narrowband carrier operating mode in which at least some downlink communications are made using a narrowband carrier formed of a restricted subset of transmission resources selected from within a system frequency bandwidth and comprising a restricted bandwidth downlink channel having a channel bandwidth which is smaller than the system frequency bandwidth, wherein the base station is configured to:
establish an extent to which the base station and at least one neighboring base station support the narrowband carrier operating mode; and
convey an indication of the extent to which the base station and the at least one neighboring base station support the narrowband carrier operating mode to the terminal device operating in the wireless telecommunication system so the terminal device can take account of the indication of the extent to which the base station and the at least one neighboring base station support the narrowband carrier operating mode for controlling its acquisition of a base station of the wireless telecommunication system.

7. The base station of claim 6, wherein
the terminal device is connected to the base station and is not connected to the at least one neighboring base station.

8. The base station of claim 6, further configured to receive from at least one further base station an indication of the extent to which the at least one further base station supports the narrowband carrier operating mode in the wireless telecommunication system.

9. The base station of claim 6, configured such that the indication of the extent to which the base station and the at least one neighboring base station support the narrowband carrier operating mode is conveyed to the terminal device using explicit signalling.

10. The base station of claim 9, wherein
the explicit signalling comprises system information signalling.

11. A base station for use in a wireless telecommunication system comprising one or more base stations which support a narrowband carrier operating mode in which at least some downlink communications are made using a narrowband carrier formed of a restricted subset of transmission resources selected from within a system frequency bandwidth and comprising a restricted bandwidth downlink channel having a channel bandwidth which is smaller than the system frequency bandwidth, the base station comprising:
processing circuitry configured to establish an extent to which the base station and at least one neighboring base station support the narrowband carrier operating mode; and
a transmitter configured to convey an indication of the extent to which the base station and the at least one neighboring base station support the narrowband carrier operating mode to the terminal device operating in the wireless telecommunication system so the terminal device can take account of the indication of the extent to which the base station and the at least one neighboring base station support the narrowband carrier operating mode for controlling its acquisition of a base station of the wireless telecommunication system.

12. The base station of claim 11, wherein
the terminal device is connected to the base station and is not connected to the at least one neighboring base station.

13. The base station of claim 11, further comprising:
a receiver configured to receive from at least one further base station an indication of the extent to which the at least one further base station supports the narrowband carrier operating mode in the wireless telecommunication system.

14. The base station of claim 11, wherein
the indication of the extent to which the base station and the at least one neighboring base station support the narrowband carrier operating mode is conveyed to the terminal device using explicit signalling.

15. The base station of claim 14, wherein the explicit signalling comprises system information signalling.

* * * * *